May 14, 1957  R. A. BUTTKE  2,792,036
PLANER AND ATTACHMENTS THEREFOR
Filed Oct. 8, 1951  9 Sheets-Sheet 1

INVENTOR
RICHARD A. BUTTKE

BY Strauch, Nolan & Diggins
ATTORNEYS

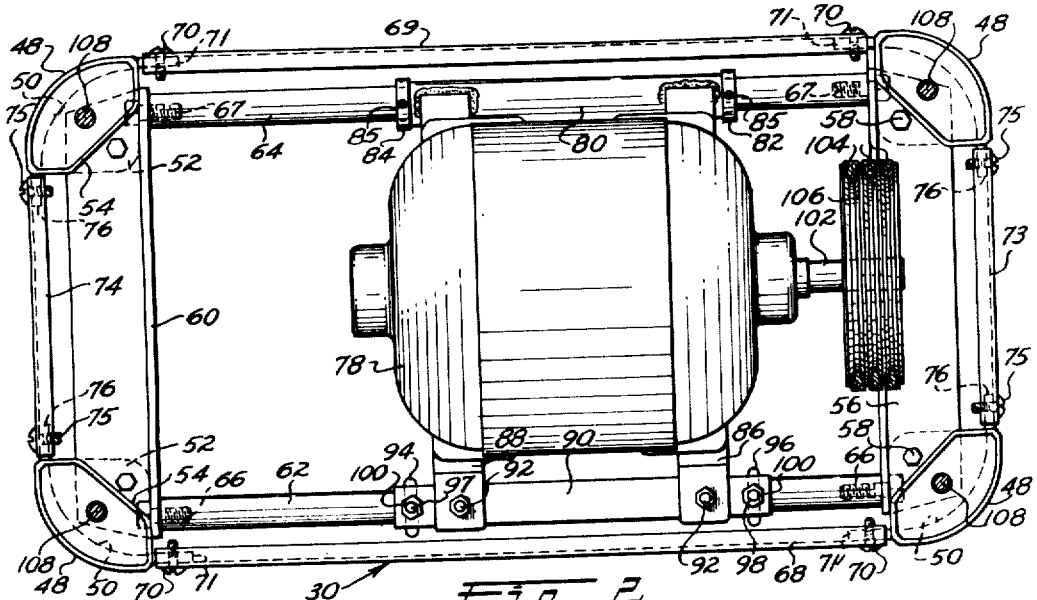
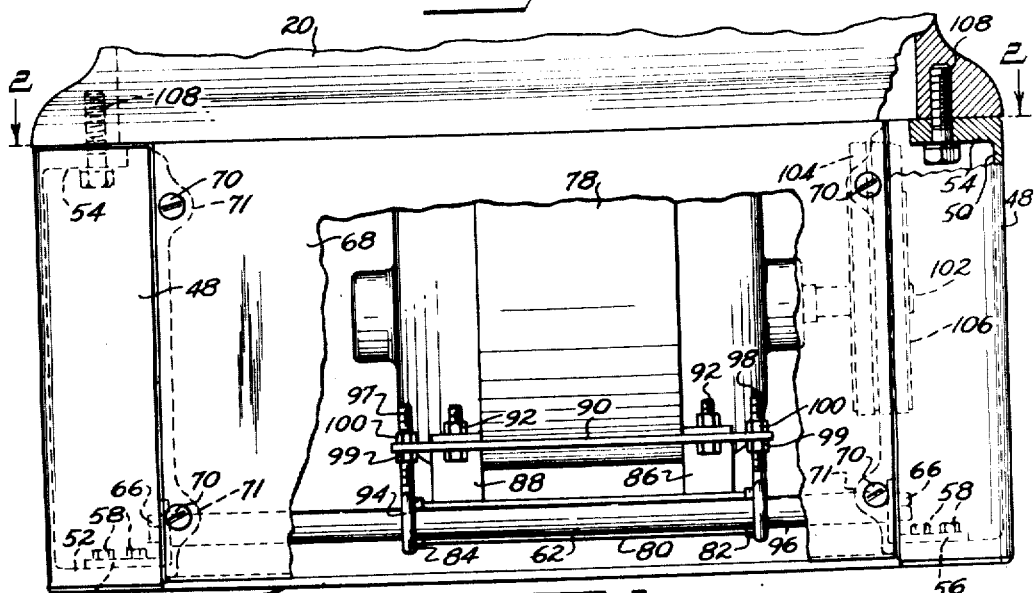
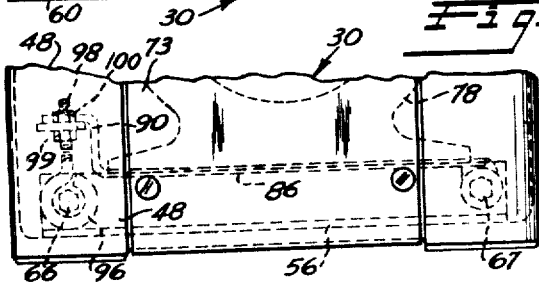

May 14, 1957 R. A. BUTTKE 2,792,036
PLANER AND ATTACHMENTS THEREFOR
Filed Oct. 8, 1951 9 Sheets-Sheet 3

INVENTOR
RICHARD A. BUTTKE
BY Strauch, Nolan & Diggins
ATTORNEYS

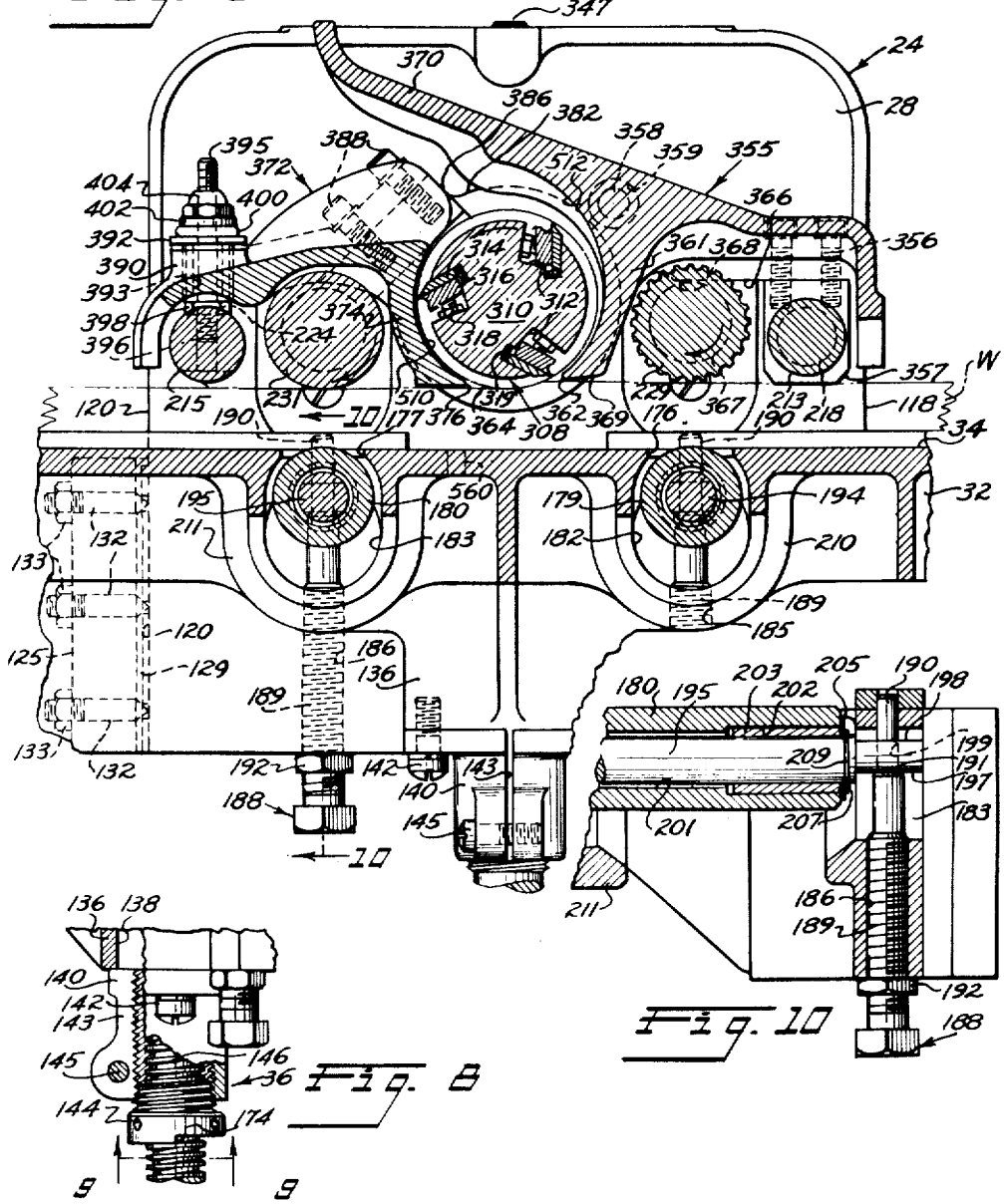

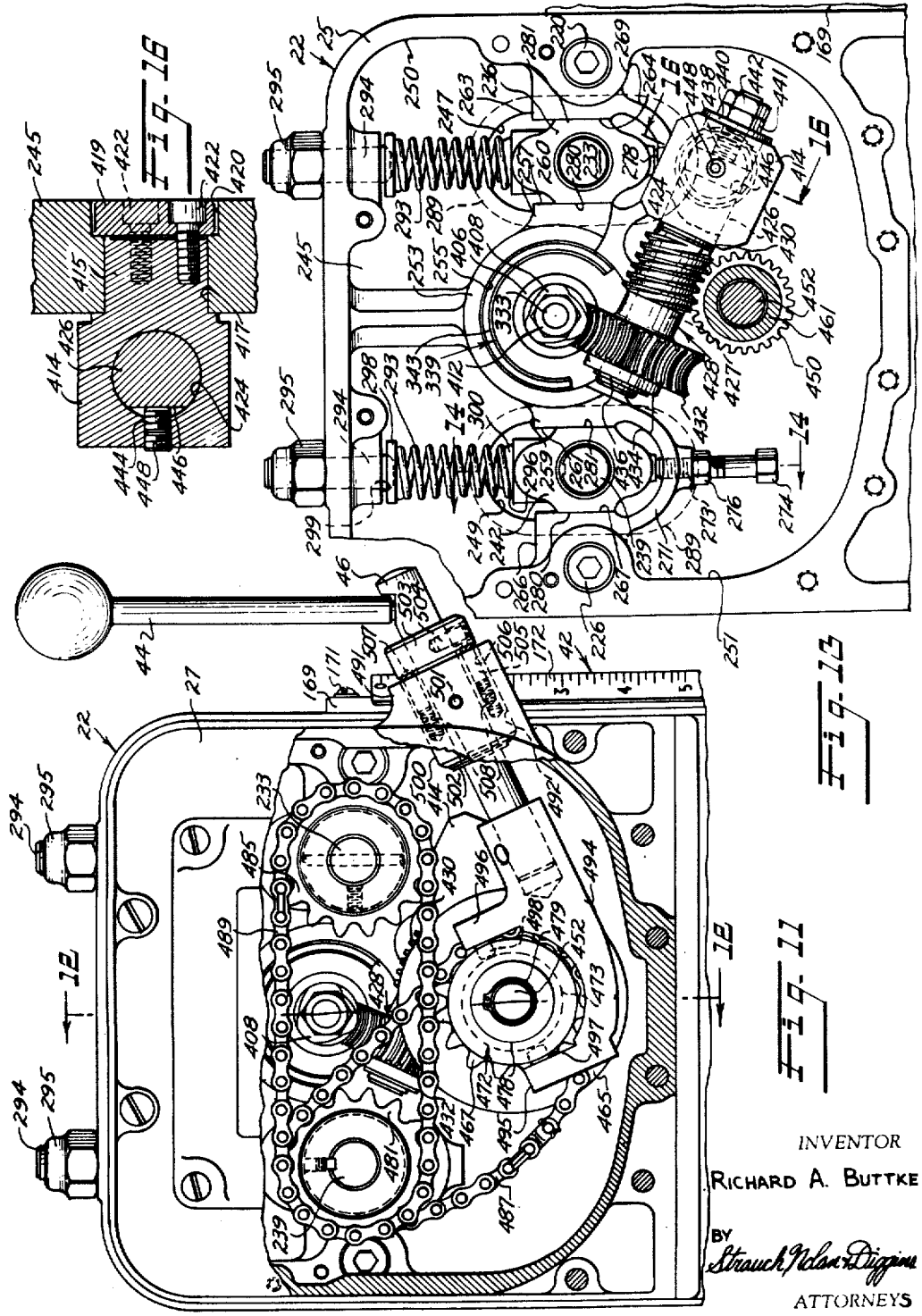

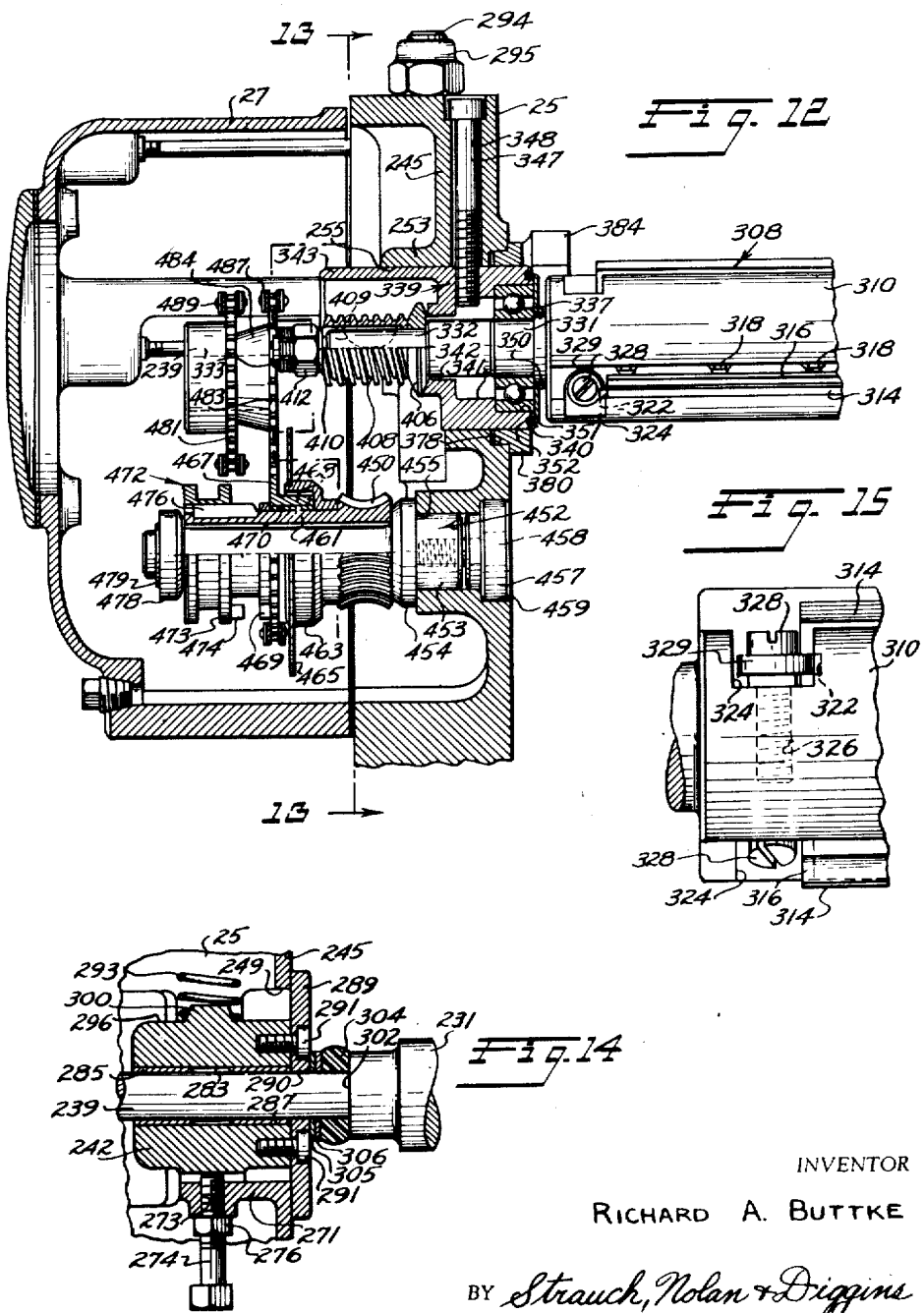

May 14, 1957 R. A. BUTTKE 2,792,036
PLANER AND ATTACHMENTS THEREFOR
Filed Oct. 8, 1951 9 Sheets-Sheet 7
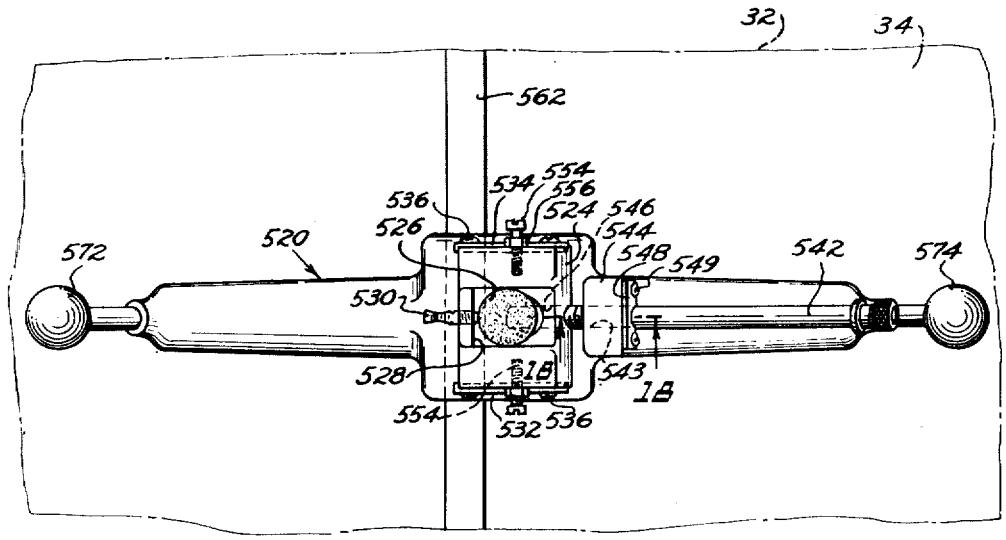
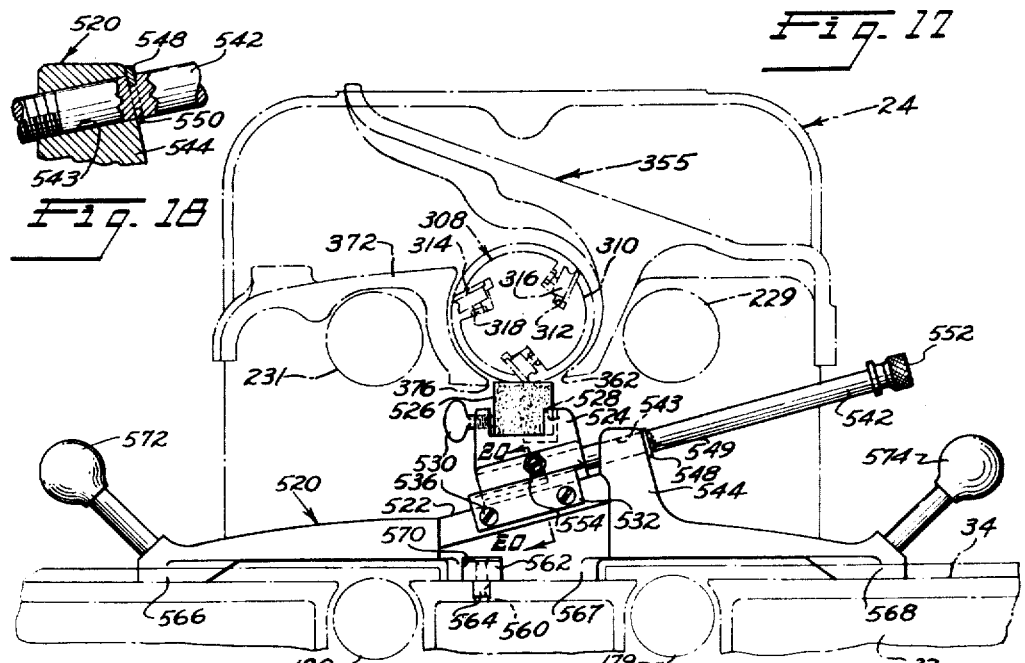
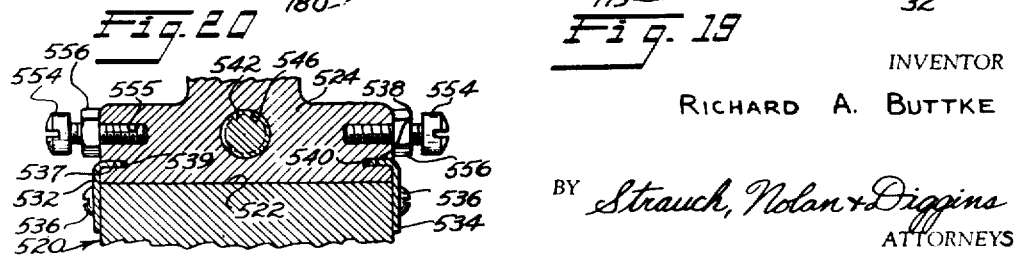
INVENTOR
RICHARD A. BUTTKE
BY Strauch, Nolan & Diggins
ATTORNEYS

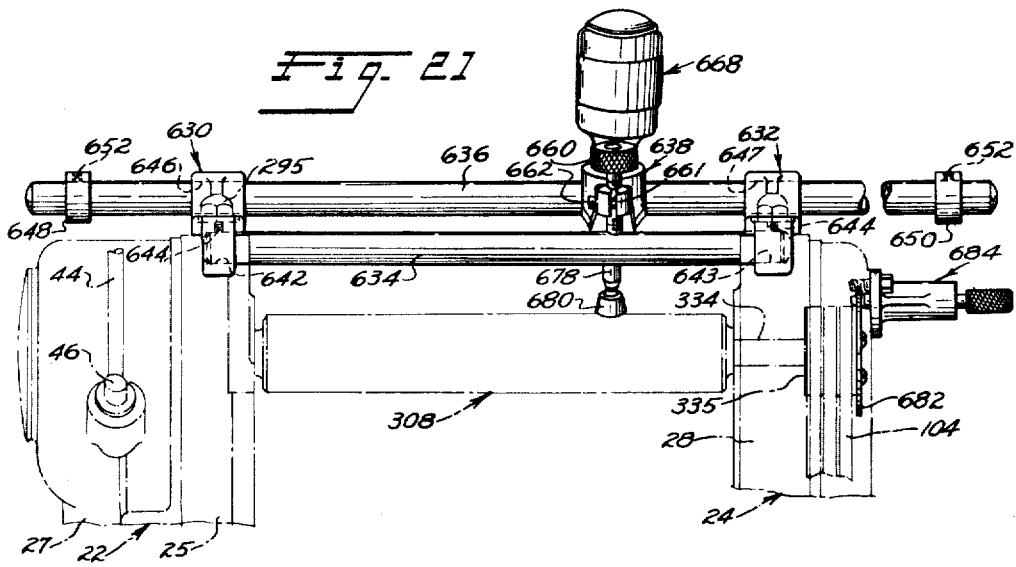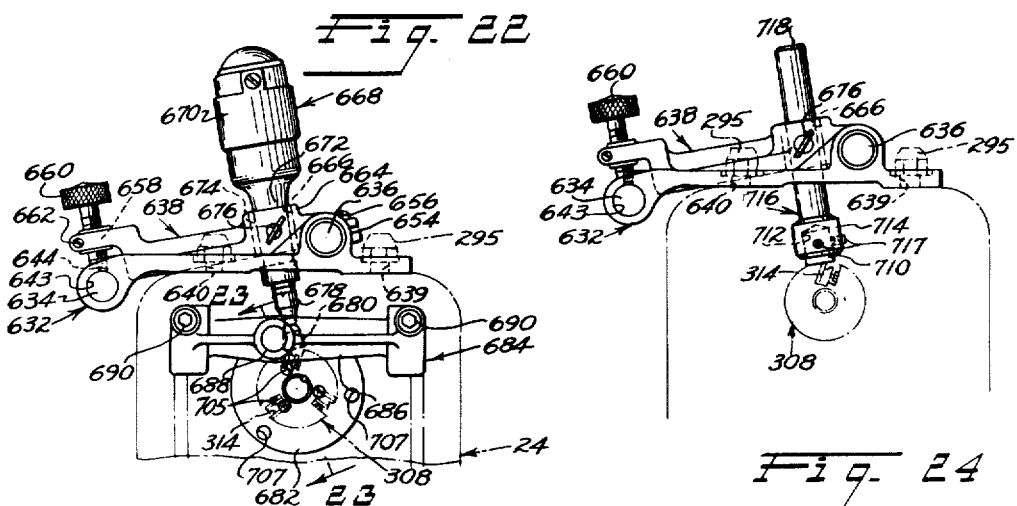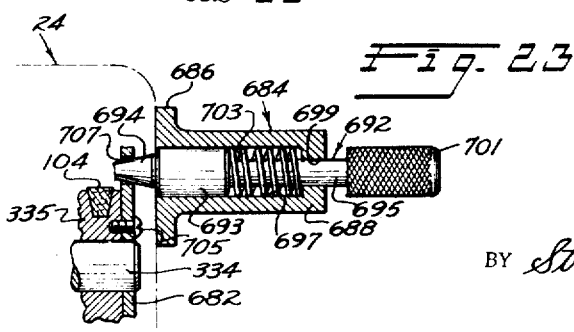

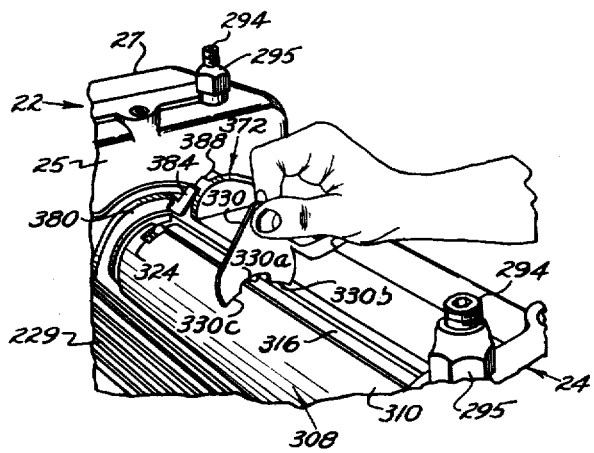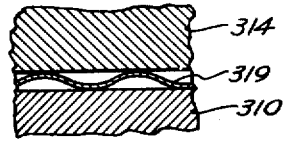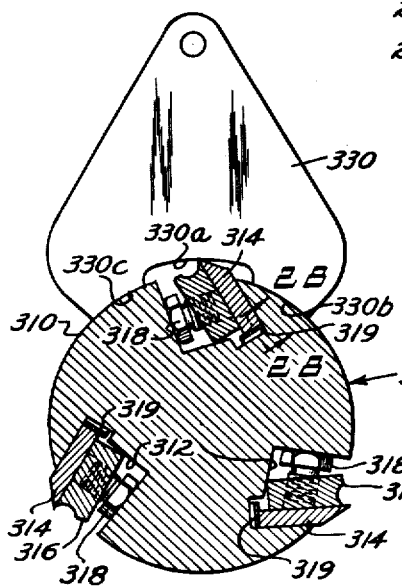

United States Patent Office 2,792,036
Patented May 14, 1957

2,792,036

PLANER AND ATTACHMENTS THEREFOR

Richard A. Buttke, Milwaukee, Wis., assignor to Rockwell Manufacturing Company, Pittsburgh, Pa., a corporation of Pennsylvania Application October 8, 1951, Serial No. 250,345

23 Claims. (Cl. 144—114)

The present invention relates to improvements in woodworking machinery and more particularly to improvements in the construction and structural arrangement of wood planing machines and of maintenance attachments therefor.

In the operation of woodworking machines, one of the greatest difficulties is the deleterious effect upon the smooth and accurate operation of the machine of the accumulations or deposits of gum, pitch, and wood dust and chips. When gum or pitch collects on relatively movable parts of the machine it causes them to stick and prevents their proper smooth movement. When wood dust and wood chips collect on the parts of the machine it wedges between the relatively moving parts, absorbs the lubricant applied thereto and thus also inhibits normal smooth operation and accurate adjustment, and prevents the production by the machine of the desired smooth finished product.

It is, accordingly, the primary object of this invention to provide an improved wood planing machine adapted to produce a more uniformly perfect finished surface through removal of most of the waste product of the cutting operation, prevention of the collection of wood dust on the machine at points where it can absorb the lubricant applied to the machine and improved adjustments and attachments for easily maintaining the machine in optimum operating condition.

A further object of this invention is to provide a planing machine of improved construction in which most of the wood particles are conveyed from the machine so as not to interfere with the operation thereof and in which the deleterious effects of wood dust accumulation on the parts of the machine is obviated.

In certain prior art woodworking machines having rotary cutter heads employing elongated cutting knives mounted in longitudinally extending slots of a cutter head body member, provision has been made for the removal of knife blades by forcing the blades out of the slots in which they are mounted. The need of some device for facilitating the removal of the cutting knives arises from the fact that, during operation of machines of this type, gum and pitch from the wood collect on the blades and cause them to stick in the slots in which they are mounted. United States Letters Patent No. 406,587 to V. V. Lawrence and 1,039,054 to H. C. Hartzell issued respectively on July 9, 1889 and September 17, 1912, disclose devices typical of those heretofore devised for this purpose. The present invention provides an improved mechanism which facilitates removal of the knife blades from the cutter head, for cleaning or replacement and, in addition, permits accurate alignment and positioning of the knife blades in the slots so the amount of knife projection from the cutter head body can be accurately controlled without the danger of the operator's hands being cut by the knife blades. This feature is of particular importance in properly aligning the knife blades within their slots for sharpening and for maintaining the proper clearance and alignment between the knife blade cutting circle and the related parts of the planer.

It is, therefore, a further important object of this invention to provide an improved method and apparatus by which the knife blades of a woodworking machine cutterhead can be accurately and uniformly adjusted to the cutterhead cutting circle even while the cutter head is mounted in its normal operating position upon the woodworking machine.

A further important object of this invention is the provision of a cutter head for a woodworking machine of an improved construction by which the position of the knife blades in the longitudinal slots of the cutter head body may be accurately adjusted, and by which the knife blades may be easily removed from the cutter head body when necessary.

A further object of this invention is the provision of improved jointing and grinding attachments for a planing machine, which are simple in construction, easily manipulatable for sharpening the cutter head knife blades without removing them from the machine, and accurate in operation, so that the proper clearances relative to the pressure bar and chip breaker is assured and smooth cutting of the workpiece can be easily maintained.

A further important object of the present invention is to provide a new and improved chip breaker and pressure bar construction and mounting which greatly increases the effectiveness with which each performs its function, and at the same time perform, in addition, certain ancillary functions, facilitating the safe operation of the machine and the disposal of the waste products of the cutting operation.

In the mounting of both chip breakers and pressure bars, it is of primary importance that each be adapted to exert a controlled pressure upon the workpiece fed under the cutter head as close to the cutting circle of the cutter head knives as possible. In the past, it has been the general practice to mount both the chip breaker and the pressure bar for pivotal movement about an axis concentric with the cutter head axis of rotation so that it is impossible for either to move into the path of rotation of the cutter head knife. When chip breakers are so mounted, a workpiece fed to the cutter head along the work support surface will frictionally engage the forward portion of the chip breaking edge and tend to pivot the chip breaker about its axis in the direction of movement of the workpiece. As the chip breaker pivots, it tends to wedge the workpiece against the work support surface. Under certain operating conditions, this wedging action prevents a smooth continuous feed of the workpiece to the cutter head and results in irregularities on the planed surface. It is a further object of the present invention to provide an improved chip breaker mounting which eliminates this difficulty.

More specifically, the present invention provides an improved chip breaker mounting for accurately and automatically positioning the chip breaker vertically relative to the cutting circle of the cutter head knives in accordance with the depth of cut to be taken and exerting only sufficient pressure upon the workpiece to assure the formation of small chips during the cutting operation so that a smooth unsplintered finished product results.

It is a further important object of this invention to provide a chip breaker of improved and simplified construction which also serves as a guard, shielding the operator from the cutter head.

An important consideration in the design of a planer is the provision of means for removing the chips and shavings from the vicinity of the cutter head, and the prevention of the deposit of these chips and shavings on the machine at points where they will absorb lubricant, interfere with the line of vision of the operator or jam between relatively moving parts of the mechanism. In the past, expensive vacuum systems have been used alone or in connection with receptacles into which chips are thrown from the cutting knives. Examples of such prior art structures are found in United States Letters Patent 145,375 to W. Weaver and 1,079,032 to P. A. Solem issued respectively on December 9, 1873 and November 18, 1913.

A further object of the present invention is to provide a planer with an improved and simplified system of disposing of chips and shavings resulting from the cutting operation consisting of a chip breaker formed around the cutting head in a manner to coact with the rapidly rotating cutter head and form a blower, the cutting head being the rotor and producing a high velocity air stream passing over the line of cutting engagement of the cutter head for conveying chips and shavings from the vicinity of the cutting head to a point beyond the rear of the machine. By this construction, most of the machine and the portion of the workpiece fed toward the cutting head remains free of chips so the operator can see clearly how to feed the workpiece to the cutting head and the accumulation of wood particles on the lubricated relatively moving parts of the machine is prevented.

A further object of this invention is the provision, in a planing machine, of a pressure bar and mounting therefor of an improved nature adapted to more firmly hold a workpiece against the work support table without the possibility of producing deformation thereof.

More specifically, it is an object of this invention to provide an improved pressure bar mounting wherein the pressure bar is preloaded against a stop in a position such that its workpiece engaging edge lies in a plane substantially tangent to the cutting circle and parallel to the work support surface, so that a workpiece will be firmly held thereby as it is fed from the cutting head without producing deformation thereof.

A further important object of this invention is the provision of a rigid, enclosed support base cabinet which is economical to manufacture and provides a firm, easily adjustable motor mount for the planer drive motor and a substantially dustproof housing for the drive motor to prevent the accumulation of wood dust and chips thereon.

It is another object of this invention to provide an improved cutter head and power driven feed roll mounting for planing machines by which the bearings of and drive mechanism for these elements are shielded against the entrance of wood particles.

A further object of this invention is to provide a planer with an improved work support table adjusting mechanism eliminating interference by wood particles with the operation thereof.

A still further object of this invention is to provide a planer with an improved mechanism for indicating the depth of cut adjustment of the work support table, the construction being such that reading of the indication thereof will not be inhibited by wood dust accumulations and is readily visible by the operator from all normal operating positions.

In wood planing machines, it is customary to provide idler rollers mounted on the support table below the planer work support surface thereof in such a position that a segmental portion of each roller projects above the planer surface. Such rollers are intended to reduce the resistance to movement of a workpiece toward the cutter head resulting from frictional contact between the workpiece and the work support table. It has been customary in the prior art to mount one of such idler rollers for rotation about an axis lying in each of the planes including the axis of rotation of each of the power driven feed rollers and normal to the planer work support surface. It is apparent that, while the idler rollers project only a few thousandths of an inch above the work support surface, a workpiece can pivot slightly about its line of contact with the idler roller because, except at such times as a workpiece is under the control of both the infeed and outfeed power driven rollers, the end of the workpiece is held against the work support surface solely by the force of the pressure bar or the chip breaker. This lack of firm support for a workpiece results in an uneven rough surface at the ends of a planed surface on a workpiece fed through the machine.

It is a further object of this invention to provide an improved mechanism for feeding a workpiece toward and from the cutter head of a planing machine so as to eliminate such irregularities in the cutting of the end portions by firmly holding the ends of such workpieces against the ends of such work table planer surface while passing under the cutting head.

It is a further object of this invention to provide an improved planing machine in which the power driven feed rollers are so mounted in relation to the work supporting idler rollers, that the leading and trailing edges of a workpiece fed therebetween are firmly held against the work support surface while passing under the cutter head.

More specifically, it is an object of this invention to provide an improved planing machine in which the axes of rotation of the spring loaded power driven feed rolls are disposed closely adjacent those of the idler support rollers and offset longitudinally of the machine toward the cutter head so the leading and trailing edges of a workpiece are respectively firmly held against the support tables while passing below the cutter head.

These and other objects of this invention will become more fully apparent by reference to the appended claims and the following detailed description when read in connection with the accompanying drawings, wherein like reference numerals designate like parts and:

Figure 2 is a plan view of the cabinet type base structure of my improved planer being in effect a horizontal section taken along the line 2—2 of Figure 3;

Figure 3 is a partially sectioned front elevation view of the base structure of the planer of Figure 1;

Figure 4 is a fragmentary right side view of the planer base structure showing the adjustable drive motor mount;

Figure 7 is a vertical sectional view of the planer taken substantially along the line 7—7 of Figure 6 and showing the relative positions of the machine parts when a cut of approximately one-half maximum depth is being taken upon a workpiece;

Figure 8 is an enlarged, fragmentary, partially sectioned, front elevation view of a portion of the planer work support table raising and lowering mechanism;

Figure 9 is a sectional view of the mechanism of Figure 8 taken substantially along the line 9—9 of Figure 8;

Figure 10 is a fragmentary sectional view of the work support table roller mounting taken substantially along the line 10—10 of Figure 7;

Figure 11 is a partially sectioned left side view of the top of the left side column showing the feed roll drive mechanism;

Figure 12 is a sectional view of the drive mechanism of Figure 11 taken substantially along the line 12—12 of the figure, the angularly disposed intermediate gear cluster 428 having been omitted for clarity;

Figure 13 is a vertical sectional view of the drive mechanism of Figure 11 taken substantially along the line 13—13 of Figure 12;

Figure 14 is an enlarged vertical sectional view of the outfeed roller mounting taken substantially along the line 14—14 of Figure 13;

Figure 15 is an enlarged fragmentary elevational view of one end of the cutter head showing the knife blade adjustment;

Figure 16 is a fragmentary sectional view of the mounting block and shaft for the intermediate gear cluster of the feed roll drive mechaism, taken along the line 16—16 of Figure 13;

Figure 17 is a top plan view of the jointing attachment for the planer;

Figure 18 is a fragmentary sectional view of that attachment taken along the line 18—18 of Figure 17;

Figure 19 is a left side elevational view of the jointing attachment of Figure 17, the outline of the planer being shown in phantom lines to illustrate the mounted position of this attachment;

Figure 20 is a fragmentary sectional view of this attachment taken along the line 20—20 of Figure 19;

Figure 21 is a front elevational view of the combined grinding and jointing attachment of my present invention as adapted for use in grinding the cutter head knife blades, the related parts of the planer having been shown in phantom lines to illustrate the mounted position of this attachment;

Figure 22 is a right side view of the attachment of Figure 21, the planer parts being shown in phantom lines;

Figure 23 is a fragmentary sectional view of the cutter head indexing mechanism of this attachment which is used during a grinding operation;

Figure 24 is a right side view of this attachment as adapted for use in jointing the knife blades;

Figure 25 is a fragmentary perspective view of the planing machine with the chip breaker removed showing the manner in which the cutter head knife blade projection is checked;

Figure 26 is a similar fragmentary perspective view showing the manner of adjusting the knife blade projection;

Figure 27 is a radial cross-sectional view of the cutter head showing the relation of a cutter head knife blade to the knife blade gauge when the knife blade projection is correct; and Figure 28 is an enlarged fragmentary sectional view of the cutter head taken along the line 28—28 of Figure 27 and illustrating the longitudinal configuration of the outward resilient biasing of the knife blades.

Figure 1:
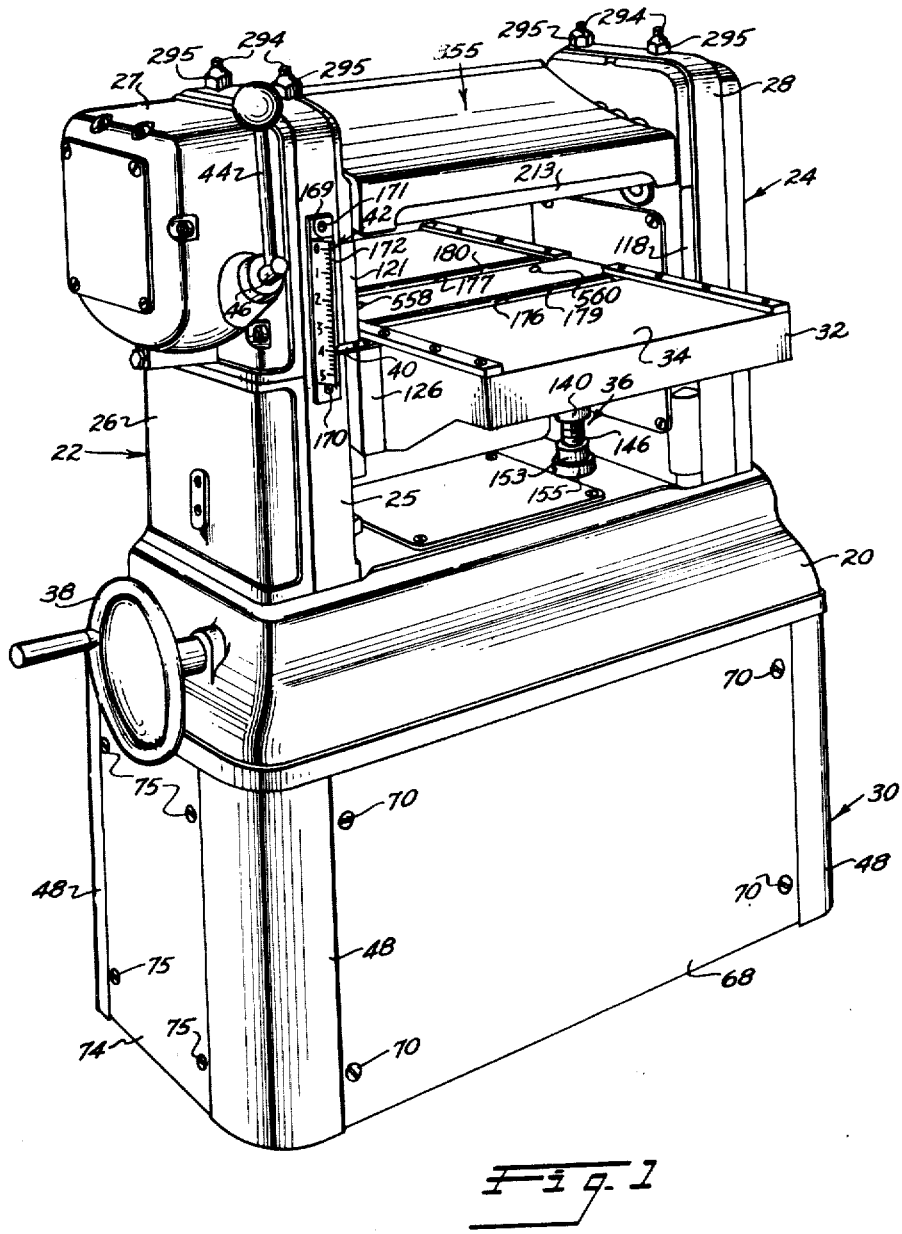
Figure 1 is a perspective view of an improved planer embodying the principles of my present invention.

The general structural arrangement of the improved planer of the present invention is shown in Figure 1.

This improved planer comprises a main base casting 20 from the opposite ends of which a pair of spaced columns 22 and 24 project upwardly. Column 22 is generally hollow in form and consists of three castings 25, 26 and 27, casting 25 being fixed to the base casting 20 and castings 26 and 27 being fixed to casting 25. Column 24 is also generally hollow in form and consists of a single casting 28, being fixed to the base casting 20. Base casting 20 rests upon a cabinet type, enclosed support structure 30 within which the planer drive motor is mounted.

A power driven cutter head and power driven parallel feed rolls extend between and are mounted for rotation at their ends on columns 22 and 24 near the top thereof. Below these feed rolls and this cutter head, which are not visible in Figure 1, a work support table 32, having a horizontal planer work support surface 34, extends between and is guided on columns 22 and 24 for limited translatory movement up and down between the columns 22 and 24 for adjusting the machine to accommodate pieces of lumber of different thicknesses. Vertical adjustment of table 32 is effected by a raising and lowering mechanism operated by manipulation of a handwheel 38 on the left side of the base casing 20. The position of the table 32 relative to the cutter head is indicated by the coaction of a pointer 40 fixed to the table 32 with a scale 42 fixed to column 22 parallel to the path of movement of table 32.

Figure 6:
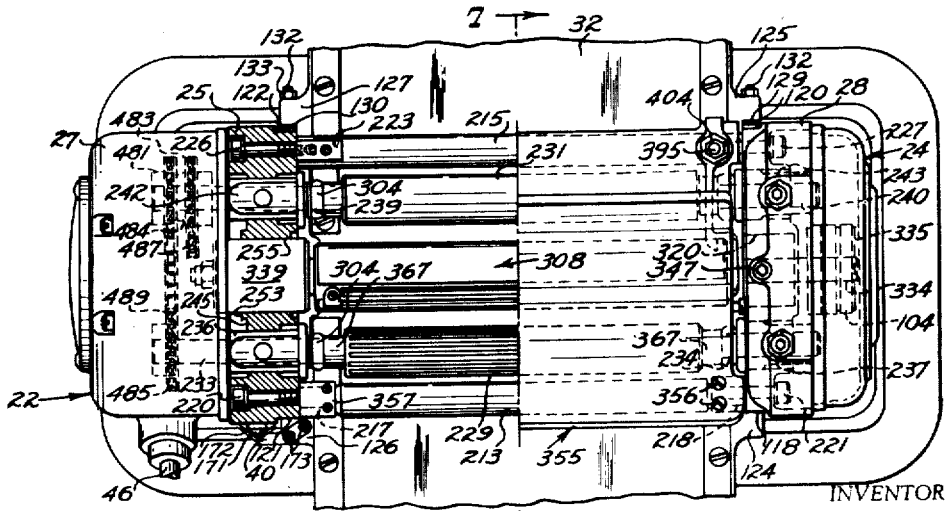
Figure 6 is a partially sectioned plan view of the planer of Figure 1, the section being taken substantially along the line 6—6 of Figure 5.

The cutter head is driven from the drive motor mounted within the support structure 30 by drive belts extending upwardly through base 20 and column 24 (Figure 2). The feed rolls are driven through a clutchable reduction drive mounted within the top portion of column 22 and driven from the cutter head (Figure 6). The engagement of the drive to the feed rolls is controlled by manipulation of a handle 44 which is fixed to a pivot shaft 46 projecting from the casting 27 of column 22.

The detailed structure of the foregoing parts of this improved planer will now be described in detail.

*Cabinet type support structure and motor mount*

Referring first to Figures 2, 3, and 4 the support structure 30, upon which the base casting 20 is mounted, is provided at its four corners with legs 48. Each leg 48 has an arcuate wall 50 (Figure 2), a bottom end wall 52 formed integrally on the inside of wall 50, and a top end wall 54, integrally formed on the inside of wall 50 at its upper end (Figure 3).

The front and rear side legs 48 are connected at their bottom ends by a tie bar 56, which is conveniently formed of angle iron. Tie bar 56 is rigidly secured at its respective ends to bottom end walls 52 of right front leg 48 and of right rear leg 48 by means of screws 58, which are threaded into the bottom end walls 52. The front and rear left-hand legs 48 are rigidly connected in the same manner by a similar tie bar 60.

Tie bars 56 and 60 are rigidly interconnected by means of front and rear tie rods 62 and 64. The tie rods 62 and 64 are rigidly connected at their ends to the vertical sides of tie bars 56 and 60 by screws 66 and 67 respectively. The four legs 48, the two tie bars 56 and 60 and the front and rear tie rods 62 and 64 are thus all rigidly connected together to form the skeleton frame upon which the base casting 20 of the planer is mounted.

The front and rear sides of support structure 30 consist of panels 68 and 69 preferably formed of sheet steel secured respectively between the two front and the two rear legs 48 by screws 70 threaded into ears 71 of legs 48 as shown in Figures 2 and 3. The right and left sides of support structure 30 consist of sheet steel panels 73 and 74 secured respectively between the two right and the two left side legs 48 by screws 75 threaded into ears 76 of legs 48.

The planer drive motor, designated 78, is supported within the cabinet 30 upon an improved motor mount which permits easy adjustment of the drive belt tension by raising or lowering the motor and also lateral adjustment of the motor. A sleeve 80 is rotatably received on rear tie rod 64 and is secured thereon against longitudinal movement between a pair of collars 82 and 84 fixed to tie rod 64 by set screws 85. The motor 78 is fixed to and supported by two brackets 86 and 88 which are of like longitudinal configuration best shown in Figure 4. The rear ends of brackets 86 and 88 are secured to sleeve 80 as by welding as shown in Figure 2. A cross bar 90 is secured between the upwardly offset forward portions of brackets 86 and 88 by bolts 92. A pair of eye bolts 94 and 96 are loosely received on front tie rod 62 and formed with threaded shanks 97 and 98 respectively, which pass upwardly freely through aligned holes in the ends of cross bar 90. The cross bar 90 is held in vertical position relative to the shanks 97 and 98 of eye bolts 94 and 96 between lower nuts 99 and upper nuts 100 threadedly engaged with the shanks 97 and 98.

The motor 78, being rigidly mounted on the brackets 86 and 88, will move pivotally about the axis of tie rod 64 with these brackets. The shaft 102 of motor 78 may be adjusted vertically to either tighten or loosen the drive belts 104 passing around the drive pulley 106 fixed thereon by the cooperative adjustment of the nuts 99 and 100 on each of the eye bolts.

The motor 78 may also be moved laterally by loosening the set screws 85 of collars 82 and 84 and moving the motor 78 and sleeve 80 axially along the tie rods 62 and 64. This adjustment permits the use of various sizes of motors and makes it possible to vertically align the motor pulley 106 with the pulley on the cutter head.

As shown in Figure 3, the base casting 20 of the planer proper is mounted on this support structure 30 formed by the legs 48 and the front and rear panels 68 and 69 and the side panels 73 and 74 by a bolt 108 at each corner passing through a hole in the upper end wall 54 of each leg 48 and threaded into an aligned threaded hole in the base 20.

Work support table mounting

Figure 5:
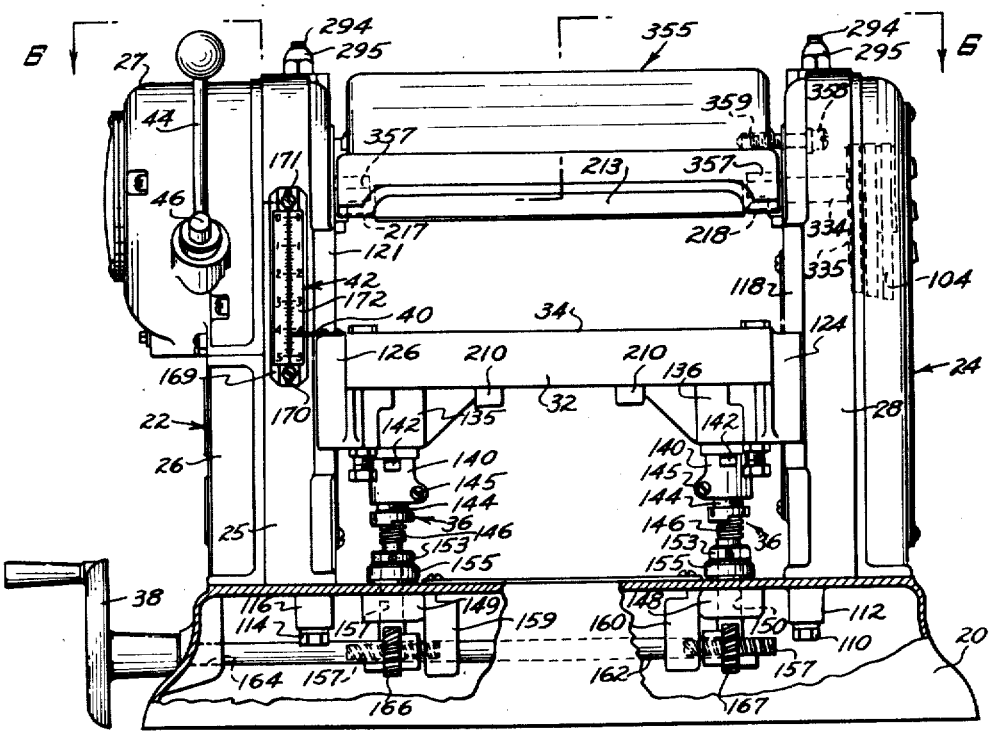
Figure 5 is a partially sectioned front elevation view of the planer of Figure 1 with the base structure removed and showing the position assumed by the chip breaker when a cut of approximately one-half maximum is being taken upon a workpiece.

Figure 5 is a front elevational view of the planer proper. The casting 28 of right-hand column 24 is rigidly secured to the base casting 20 by a plurality of machine screws 110 each passing through an apertured boss 112 formed integral with the under side of the top wall of casting 20 and each threadedly engaged with a tapped hole in the bottom wall of casting 28. The casting 25 of left-hand column 22 is similarly rigidly secured to base casting 20 by a plurality of screws 114 passing through apertured bosses 116 and threadedly engaged with aligned tapped holes in the bottom wall of casting 25.

As seen in Figures 5 and 6, the work support table 32 extends between and is guided for translatory movement in a vertical path by right and left-hand columns 24 and 22. For this purpose, front and rear parallel planer guide surfaces 118 and 120 are machined respectively on the exterior of the front and rear walls of casting 28 of right side column 24 and front and rear parallel planer guide surfaces 121 and 122 are similarly machined respectively on the front and rear walls of casting 25 of the left side column 22.

Projecting from the right side of table 32 are front and rear ears 124 and 125, while projecting from the left side of table 32 are front and rear ears 126 and 127. The ears 124 and 125 straddle the inner edge of right side column 24 while the ears 126 and 127 straddle the inner edge of left side column 22 and each is provided with a planer surface adjacent and parallel to the associated one of surfaces 118 to 122 on castings 25 and 28. These surfaces of front ears 124 and 126 bear upon guide surfaces 118 and 121 respectively. Between the inner surface of right rear ear 125 and surface 120 and between the inner surface of left rear ear 127 and surface 122, gibs 129 and 130 are respectively interposed. As is best shown in Figure 7, gib 129 is positioned by three conical ended screws 132, threaded through ear 125. Gib 130 is similarly positioned by similar screws in ear 127, the conical ends of the screws being received in aligned recesses in gibs 129 and 130. The gibs 129 and 130, therefore, move vertically with table 32 and provide bearing surfaces between rear guide surfaces 120 and 122 on columns 24 and 22 and the rear ears 125 and 127 on table 32. It will be seen that, by manipulation of screws 132, the tightness of the sliding contact between the table and the columns may be adjusted and, thus, any wear of the associated bearing surfaces may be compensated. Nuts 133 threaded on the outer ends of screws 132 are provided to lock this adjustment.

Table adjusting means

As previously pointed out in reference to Figure 1, a raising and lowering mechanism, operated by manipulation of hand wheel 38 is provided for shifting the position of table 32 along its guides.

Midway between the front and rear ends of table 32 and extending downward from the under side thereof are integral, hollow, cylindrical extensions 135 and 136. As best shown in Figure 8, which is an enlarged partially sectioned fragmentary view of the table raising and lowering mechanism, extension 136 is formed with a bore 138 and an internally threaded nut support 140 (shown also in Figures 5 and 7) is secured to the lower end of extension 136 in coaxial alignment with bore 138 by screws 142. Threadedly received in nut support 140 is an internally and externally threaded adjusting nut 144 (Figure 8). Nut support 140 is longitudinally split at 143 and a screw 145 is provided for compressing support 140 against adjusting nut 144 to prevent relative movement therebetween after adjustment of the latter. A table raising and lowering screw 146 is threadedly received through adjusting nut 144. Corresponding parts of this mechanism are provided below table extension 135 and have been similarly designated in Figure 5.

As shown in Figure 5, wherein the base casting 20 has been partially broken away, integrally formed on the under side of the top wall of base casting 20 are spaced bearing bosses 148 and 149 which are formed with vertical bores 150 and 151 respectively in which the lower cylindrical portions of the table raising screws 146 are rotatably journalled. Secured to each screw 146 immediately below its threaded portion and above the top wall of base 20 is a collar 153 and a thrust bearing 155 and secured to each screw 146 at its lower extremity below the bosses 148 and 149 is a helical gear 157.

Also integrally formed on the under side of the top wall of base 20 and depending downwardly therefrom forwardly of bosses 148 and 149 are a pair of coaxially aligned pillow blocks 159 and 160 which rotatably receive a shaft 162, the left end of which extends out of base casting 20 through a bore 164 to receive hand wheel 38. Spaced helical gear pinions 166 and 167 located to mesh respectively with the helical gears 157 are secured to shaft 162 on the left side of pillow block 159 and the right side of pillow block 160 respectively. The hand wheel 38 is fixed to shaft 162 exteriorly of the base casting 20. As the shaft 162 is rotated by manipulation of hand wheel 38, the table raising screws 146 are rotated due to the meshing engagement of the gear pinions 166 and 167 with the helical gears 157. As the screws 146 are rotated, they are threaded into or out of adjusting nuts 144 and, since adjusting nuts 144 are fixed relative to table 22, the table is raised or lowered relative to the base casting 20 along its guides.

As mentioned at the outset, an indicator, formed by scale 42 and pointer 40, is provided for indicating the adjusted vertical position of table 32. Scale 42 includes a mounting block 169 of generally triangular prismatic form which is secured exteriorly to the front wall of the left column casting 25 by screws 170 and 171 passing through elongated slots of block 169 and threadedly engaged with aligned tapped holes in casting 25. Attached to the block 169 is a scale 172 which is of V-shape cross-section and exteriorly graduated in inches. The scale 172 fits over the two exterior faces of the prismatic block 169 and is fixed thereto as by rivets or screws (not shown). The indicating pointer 40 is secured to the top of ear 126 on table 32 by screws 173. As pointer 40 moves with the table, its edge moves along the apex line of scale 172 and coacts with the scale 172 to indicate the distance of the surface 34 of table 32 from the cutter head. The scale 172, having graduations on both of its external faces and the finger 40 projecting slightly outward from the apex of the triangle formed by the two sides of scale 172 (Figure 6) the scale 172 may be read from the front or from either side. A zero adjustment of scale 172 may be made by loosening screws 170 and 171 and vertically adjusting the block 169 along the slots thereof.

Referring again to Figures 8 and 9, it will be noted that a cut has been made across the lower face of adjusting nut 144 forming radially extending shoulders 174 and 175. These shoulders, have female threads cut therein to form a toothed scraper engaging the threads of screw 146. As the screws 146 are rotated relative to the adjusting nuts 144 in raising and lowering the table 32, the shoulders 174 and 175 serve to wipe any dust or foreign particles from the threads of screws 146, thus preventing any foreign particles from being carried into the bores 138 where they might cause damage or jamming of the threaded connection between screws 146 and nuts 144.

Table rollers

As is best shown in Figures 1, 7, and 10, the table 32 is formed with a pair of spaced transversely extending slots 176 and 177 through its work support surface. Through each of these slots projects the upper segmental portion of a respective work piece support roller 179 or 180. These rollers relieve the frictional drag on a workpiece feed over surface 34.

Figure 10 is a fragmentary sectional view of the table and the roller mounting means taken along the lines 10—10 of Figure 7. The right and left side walls of table 32 have two axially aligned cored holes, those of the right hand wall being shown in Figure 7 and designated 182 and 183. Vertical threaded holes 185 and 186 extend through the side walls from the bottom of table 32 intersecting the cored holes 182 and 183 respectively in each side wall. A bolt 188 (Figure 10) having a threaded portion 189 and a reduced upper plain end portion 190 forming a shoulder 191 is threadedly received within each of the threaded holes 185 and 186 and fixed in position by a lock nut 192.

These bolts 186 serve as end supports for a pair of transversely extending shafts 194 and 195 (Figure 7) upon which rollers 179 and 180 are journalled respectively. The ends of each of the shafts 194 and 195 (Figure 10) extend within the cored holes 182 and 183 respectively and each is machined with parallel flat surfaces 197 and 198 and formed with a diametrically extending bore 199 through which the reduced end portions 190 of bolts 188 extend. As thus mounted, the lower flat surfaces 197 rest upon the shoulders 191 of the bolts 188.

As is best shown in Figure 10 in reference to roller 180, rollers 179 and 180 each have an axial through bore 201 and a coaxial counterbore 202 at each end in each of which is received a bearing 203. The shaft 195 extends through the bore 201 of roller 180 and the roller 180 is mounted for rotation relative to the fixed shaft 195 by the end bearings 203. The rollers 179 and 180 are, therefore, free to rotate about the shafts 194 and 195 respectively. As previously mentioned, the top segmental portions of rollers 179 and 180 project slightly above the table 32. While this projection is preferably in the order of .005 of an inch, it may be varied within limits by vertically adjusting bolts 188.

A washer 205 and a split resilient retainer ring 207 engaging an annular groove 209 in shafts 194 and 195 is provided at each end of each roller to prevent axial movement thereof along the shafts 194 and 195.

Depending from the under side of the table 32 and integrally formed therewith are semi-circular shaped guards 210 and 211 which encircle that portion of the roller 149 that extends below the top of table 32 to protect the rollers from foreign material which might interfere with their free rotation about shafts 194 and 195 and which serve to add structural strength to the table 32.

Feed rollers

Referring to Figures 6 and 7, a pair of cylindrical tie bars 213 and 215 are fixed between the columns 22 and 24 above the table 32, their axes being transverse to the table 32 and parallel to its planer surface 34. The front tie bar 213, which has reduced portions 217 and 218 at its ends, is rigidly held between the castings 25 and 28 of columns 22 and 24 by bolts 220 and 221 extending through aligned bores in these castings and threaded into the ends of the tie bar 213. Rear tie bar 215, the end portions of which are formed with flat surfaces 223 and 224, is similarly rigidly held between castings 25 and 28 of columns 22 and 24 by bolts 226 and 227.

An infeed roller 229 and an outfeed roller 231 are mounted between the columns 22 and 24 for rotation about spaced parallel axes between tie bars 213 and 215 above table 32. The infeed roller 229 is serrated and is formed with reduced extensions 233 and 234 by which it is journalled in bearing support blocks 236 and 237. The outfeed roller 231, which is smooth, is formed with reduced extensions 239 and 240 by which it is journalled in bearing support blocks 242 and 243.

Both the bearing support blocks 234 and 236 of feed roller 229 and bearing support blocks 242 and 243 of roller 231 are similarly mounted in the columns 22 and 24 for limited vertical movement and are all spring biased toward lower limit positions as will now be explained in detail in reference to the left-hand bearing support blocks 236 and 242 which are best shown in Figure 13.

The inner side wall 245 of the casting 25 of left-hand column 22 is formed with two elongated openings 247 and 249 through which the roller extensions 233 and 239 respectively project. Midway between the front and rear walls 250 and 251 and integrally formed on the side wall 245 is a laterally extending circular boss 253 which has a bore 255. Integrally formed on either side of and extending from the boss 253 are ears 257 and 259 which have respective machined ways 260 and 261 extending parallel to and slightly overlapping the sides of openings 247 and 249 respectively. Formed integrally on front wall 250 and laterally extending therefrom is an ear 263 which has a machined way 264 extending parallel to the side of opening 247 and parallel to and directly opposite to machined way 260 on ear 257. Similarly integrally formed on the rear wall 251 and extending laterally therefrom is an ear 266 which has a machined way 267 extending parallel to the side of opening 249 and parallel and directly opposite to machined way 261 on ear 259. Depending from the bottom of ears 257 and 263 is an arcuate brace 269, which straddles the space between the ears 257 and 263, while depending from the bottom of ears 259 and 266 and straddling the distance between them is a similar brace 271.

At a point midway between the ears 259 and 266, the brace 271 has a vertical threaded bore 273 into which is threadedly received a screw 274 adapted to be fixed in position therein by a lock nut 276. The brace 269 has a vertical bore (not shown) in which a knurled stop button 278 having a knurled shank is fixedly driven.

The bearing support blocks 236 and 242, which journal the left-hand shaft extensions 233 and 239 of the infeed roller 229 and outfeed roller 231 respectively, are each formed on their opposite sides with parallel machined surfaces 280 and 281. When the support block 236 is received between the ears 257 and 263, the surfaces 280 and 281 thereof are in sliding contact with surfaces 260 and 264. The support block 236 is, therefore, mounted for vertical sliding movement between the ears 252 and 263. The surfaces 280 and 281 of guide block 242 similarly engage surfaces 267 and 261 to guide block 242 for vertical sliding movement between the ears 259 and 266.

As is shown in Figure 14 in reference to guide block 242, each guide block is formed with a longitudinal bore 283 fitted with axially spaced bearing bushings 285 and 287 (Figure 14).

A plate 289, of the general shape of opening 249 in side wall 245 but slightly larger (Figures 13 and 14) and formed with a central bore 290 is secured to support block 242 by screws 291 in such a manner that bore 290 is coaxially aligned with bore 283 of support block 242. Plate 289 slidingly contacts the external surface of the inner side wall 245 of casting 25 around opening 249 and moves up and down with the support block 242 to form a dust proof cover for opening 249 preventing the ingress of wood particles into the column 22. Similar plates are provided on each of the other support blocks 236, 237, and 243.

The bearing support blocks 236 and 237 of infeed roller 229 are resiliently biased against stop buttons 278 and bearing support blocks 242 and 243 are resiliently biased against the bolts of 274 by compression springs 293 as now will be explained in detail in reference to block 242 shown in Figures 13 and 14.

A screw 294 is threaded through the top wall of casting 25 of column 22 and fixed in position relative thereto by a lock nut 295. Spring 293 is compressed between a bearing surface 296 on the top of support block 242 and a pressure cap 298 having a conical recess 299 engaged by the end of screw 294. A truncated conical boss 300 is formed on bearing surface 296 to align the lower end of spring 293 relative thereto. The springs 293, therefore, tend to urge the bearing support blocks downward against their respective stops. The pressure which springs 293 exert against the bearing support blocks may be varied by threading the screws 294 in or out of the top walls of the column castings in which they are mounted. The infeed roller 229 and outfeed roller 231 are, therefore, floatingly mounted for vertical movement against the pressure of springs 293, by means of support guide blocks 236, 237, 242 and 243.

As is best shown in Figure 14 in reference to the left end reduced shaft portion 239 of outfeed roller 231, a radially extending annular shoulder 302 is formed on each end of the central portion of each feed roll at its juncture with the reduced end portions. A neoprene or similar resilient spacer 304 and a pair of fiber washers 305 and 306 are mounted on the reduced end portions of each of the feed rollers intermediate the plates 289 and the shoulders 302. The spacers 304 are compressed respectively between the washers 306 and the shoulders 302, so that plates 289 are pressed sufficiently tightly against the inner surface of the column casting side walls to prevent chips and dust from entering the interior of the columns through openings 249, yet not so tightly as to prevent vertical free movement of the support guide blocks. The fiber washers 305 and 306 permit free relative rotation between the spacers 304 and the plates 289.

*Cutter head*

The cutter head 308, as is shown in cross section in Figure 7, is mounted for rotation above the work support surface 34 of table 32 about an axis transverse and parallel thereto and intermediate the axes of rotation of the feed rolls 229 and 231. The cutter head 308 is formed of a generally cylindrical body member 310 having a plurality of peripherally spaced longitudinally extending knife blade mounting slots 312 formed therein. A knife blade 314 is firmly clamped in each of these slots 312 by an elongated block 316 wedged thereagainst by a plurality of screws 318 threadedly engaged with the block 316 and longitudinally spaced therealong. An elongated crimped spring 319, the longitudinal configuration of which is best shown in Figure 28, is disposed centrally within each slot 312 below each knife blade 314 as is best shown in Figures 7 and 27. Springs 319 tend to bias the associated knife blades 314 slightly outwardly from the base of slots 312 for a purpose which will appear presently.

Cutter head 308 is mounted, as is shown in Figure 6, between the bore 255 of the inner side wall 245 of column casting 25 and a coaxially aligned bore 320 similarly formed through the inner side wall of column casting 28.

As is best shown in Figures 12 and 15, means are provided at each end of each knife blade 314 for retaining the blades in slots 312 and adjusting the amount of projection of the cutting edges of the knife blades 314 beyond the periphery of the cutter head body 310. For this purpose, notches 322 are formed in each end of each knife blade 314. A recess 324 is machined in the cutter head body 310 adjacent each end of each knife blade 314 and in the bottom thereof a tapped hole 326 is formed in the body member 310. A screw 328, having an annular flange 329 formed integral with the head thereof and projecting into the notch 322, is threadedly engaged with each of the tapped holes 326. The springs 319 bias the knife blades 314 outwardly of their slots 312 against the annular flanges 329 so that the knife blades 314 are firmly but resiliently positioned during adjustment of screws 328. By this structure, after release of the knife blade clamping screws 318, the knife blades 314 can be jacked out of the slots in which they are mounted if they have become stuck therein or the amount of projection of the knife blades 314 beyond the periphery of the body member 310 can be accurately adjusted for sharpening by manipulation of these screws 328.

As is shown in Figure 27, in order to facilitate adjustment of the knife blade projection, I have provided a gauge 330 formed of a relatively thin but rigid plate metal having a central arcuate edge portion 330a of a radius equal to that of the cutting circle and outer concentric arcuate edge portions 330b and 330c of radii equal to that of the periphery of the cutter head body 310. In use, the gauge is held in a position normal to the axis of the cutter head straddling the knife blade to be adjusted with the edge portions 330b and 330c engaging the cylindrical peripheral surface of the cutter head body 310. If the knife blade projection is correct, the cutting edge of the knife blade will just touch the central arcuate edge portion 330a of the gauge 330 as illustrated in Figure 27.

The knife blade projection is checked in the manner illustrated in Figure 25 by placing the gauge 330 against the cutter head 308 in the position just described at points along the entire length of the knife blade 314. If the cutting edge of the knife blade does not just touch the gauge edge 330a along its entire length, adjustment is necessary.

My improved method of adjusting the knife blade projection is best illustrated in Figures 25 to 27. The screws 318 are first loosened until the knife blade 314 is held lightly within the slot 312 by the elongated block or throat bar 316.

Then, while holding the gauge as illustrated in Figure 26, the screws 328 at the ends of the knife blade are manipulated to move the blade 314 into or out of the slot 312 as may be necessary to bring the knife blade cutting edge to the cutting circle where, along its entire length, it just engages the arcuate edge portion 330a when the edge portions 330b and 330c rest against the cutter head body as shown in Figure 27. After so adjusting the knife blade, the block 316 is again firmly clamped against the knife blade 314 by manipulation of screws 318. This procedure must be repeated for each knife blade.

The mounting of the left end of cutter head 308 is best shown in Figure 12. Cutter head 308 has at its left end a reduced bearing portion 331, a worm shaft portion 332, and a threaded end portion 333. On its opposite or pulley end, cutter head 308 has a bearing portion and a shaft portion 334 on which is mounted a drive pulley 335 (Figure 6). The inner race of an anti-friction bearing 337 (Figure 12) is received on bearing portion 331. A bearing housing 339, having co-axial bores 340, 341, and 342 and a semi-circular skirt 343, is received within the bore 255 of boss 253. The outer race of bearing 337 is received in bore 340 of bearing housing 339, the shaft portion 332 of the cutter head projecting through bores 341 and 342 therein. Bore 341 merely provides a relief and oil sump for bearing 337 permitting the inner race thereof to rotate freely relative to the outer race and the bearing housing 339. The right end of the cutter head is similarly journalled in an anti-friction bearing within the bearing housing 245 (Figure 6).

Bearing housing 339 (Figure 12) is secured against lateral or rotary motion relative to bore 255 by a screw 347 extending freely downwardly through an aperture 348 in the inner side wall 245 of casting 25 into threaded engagement with an aligned tapped hole in the housing 339. Bearing housing 345 is similarly fixed in bore 320 in column 24. A dust slinger 350, having an annular rim 351 formed along its outer periphery, is press fitted on each end of cutter head 308 for rotation therewith. The rims 351 project into aligned annular grooves 352 in the respective bearing housings 330 and 345. Any dust or chips which tend to pass towards the cutter head bearings will be thrown outward by the rotary motion of slingers 350 so that dust and chips are prevented from lodging in the bearings. It will be noted from Figures 6 and 12 that the cutter head and bearing housings may be removed as a unit by disengaging screws 347 from housings 339 and 345 and by pulling the entire assembly out in the direction of the pulley end.

Chip breaker

A chip breaker 355, of an improved form and mounting is also provided and is best shown in Figures 5 to 7 where, it will be recalled, the parts are shown in the positions assumed with a workpiece W being fed through the machine. Chip breaker 355 is pivotally mounted upon the front tie bar 213, being secured by screws 356 at each side of its forward end to a pivot block 357 rotatably received on each of the reduced end portions 217 and 218 of tie rod 213. The pivotal movement of chip breaker 355 about tie rod 213 is limited by the engagement of the end of a screw 358 (Figure 5) threaded through the inner side wall of casting 28 with an aligned bore 359 in the adjacent side wall of chip breaker 355. Bore 359 is of larger diameter than the end of the screw 358 received therein so that the pivotal movement of the chip breaker is limited to that between the points of engagement of the side wall of bore 359 with screw 358. This movement is of the order of 1/8 of an inch, which is the maximum depth of cut for which the planer illustrated is designed.

As is shown in Figure 7, chip breaker 355 is formed midway of its length with a depending transversely extending skirt portion 361 which terminates in a chip breaking edge 362. Edge 362 extends parallel to the axis of rotation of the cutter head 308 closely adjacent the cutting circle thereof which is indicated by the dot-dash line 364. The pivotal movement of chip breaker 355 is so limited by screw 358 and bore 359 that the chip breaking edge cannot move into the path of rotation of the knives 314.

At each side chip breaker 355 is formed with a downwardly facing planer surface 366. These surfaces 366 rest momentarily upon reduced portions 367 (Figure 6) of the infeed roll 229 intermediate the neoprene spacers 304 and the central serrated portion at 368 as a workpiece enters and passes under infeed roller 229 until the workpiece contacts and raises chip breaker 355 as in Figure 7. Thus as a workpiece of a thickness not greater than the vertical distance between the table surface 34 and front tie bar 213 is fed along the surface 34 under infeed roller 229, the infeed roller will climb upon the top surface of the workpiece, engage surfaces 366 and simultaneously cause the chip breaker 355 to pivot about the axis of the tie bar 213 to lift the chip breaking edge 362 to the position necessary to accommodate the thickness of the workpiece, that is to a position such that the upper leading edge of the workpiece will always engage the inclined surface 369 of the chip breaker 355 at substantially the same point to slide under and lift the chip breaking edge 362 to a position on which it rests upon the top surface of the workpiece. Infeed roller 229 thus is automatically raised in proportion to the depth of cut to be taken and performs the double function of sensing the depth of the cut to be taken and of automatically adjusting the chip breaking edge 362 in accordance therewith. As a result of this latter adjustment chip breaker edge 362 moves closer to the cutting circle, when deep cuts are taken, and shorter chips result.

Chip breaker 355 is formed with an upwardly and rearwardly extending portion 370 which extends over the cutter head sufficiently far so that an operator, if by chance he should grasp the upper edge of the chip breaker, would not extend his fingers around the rear edge into the path of the knives 314. Chip breaker 355, thus, in addition to its primary function, serves as a guard shielding the operator from the cutter head 308.

Pressure bar

A pressure bar 372, having a skirt portion 374 depending between the cutter head 308 and the outfeed roll 231 and terminating in a workpiece engaging edge 376 extending parallel to the axis of rotation of the cutter head 308, is mounted for limited pivotal movement coaxial with the cutter head 308 and is resiliently biased toward the position shown in Figure 7.

As is shown in Figure 12, coaxial with bore 255 in casting 25 of column 22 there is an inwardly facing counterbore 378. A reduced annular portion of a support ring 380 is freely rotatably received in counterbore 378 around the bearing housing 339. A right hand support ring 382, shown in Figure 7, is similarly received in a counterbore in the inner face of casting 28. Integrally respectively formed on rings 380 and 382 are mounting ears 384 and 386. The pressure bar 372 is secured at its opposite edges to these ears 384 and 386 by screws 388 as is illustrated in Figure 7 in reference to ring 382. The pressure bar 372, being mounted on the support rings 380 and 382 which are rotatable about the axis of the cutter head 308, the edge 376 of the depending portion 374 will never interfere with the cutting circle 364 regardless of the position of the pressure bar 372.

At its rear edge the pressure bar 308 is resiliently biased toward the tie bar 215 at its right and left corners by means now to be described. While the left rear biasing means is not shown in the drawings, it is to be understood that the pressure bar 372 is biased at its left rear corner to tie bar 215 in a manner and with elements identical to those shown in Figures 6 and 7 for the right rear corner of the pressure bar.

As shown in Figure 7, the pressure bar 372 has formed on its upper surface at its right rear corner a boss 390 threadedly receiving an adjusting nut 392 which has a central bore 393. A threaded stud 395 extends freely through bore 393 in adjusting nut 392 and its lower end 396 is threaded into tie bar 215 at its flat end portion 224. A lock nut 398 locks the stud 395 in place in tie bar 215. Received on the stud 395 above the adjusting nut 392 is a flexible pressure pad 400, preferably made of neoprene, a washer 402, and a nut 404 threaded on the end of stud 395 above the pressure pad 400 and washer 402. Nut 404 compresses the pad 400 between the adjusting nut 392 and washer 402. Counterclockwise movement of the pressure bar 372 is limited by the abutment of the adjacent end faces of lock nut 398 and adjusting nut 392. Nut 392 is threaded into or out of boss 390 until the edge 376 of the pressure bar 372 lies in a plane parallel to the table surface 34 and substantially tangent to the cutting circle 364. Nut 404 is then tightened while nut 392 is held against rotation to compress pad 400 therebetween and thus preload the pressure bar in its adjusted position.

Gear box

As mentioned at the outset, feed rollers 229 and 231 are driven from the cutter head through a reduction drive located in the upper part of column 22 and controllable by handle 44.

The elements which comprise this reduction drive are shown in detail in Figures 11, 12, 13, and 16. Referring first to Figure 12, the cutter head shaft portion 332 receives for rotation therewith, an oil slinger 406, the function of which is to prevent oil from the gears of the feed roll drive from entering the cutter head bearing 337 which is permanently lubricated. A high speed worm 408 is fixed for rotation with shaft portion 332 by a key 409 and is secured against axial movement relative thereto between a washer 410 and oil slinger 406 by a nut 412 threaded on the threaded end portion 333 of cutter head 308.

A shaft support block 414 (Figures 11 and 13) is rigidly secured to the inner side wall 245 of casting 25 below the infeed roll support block 236 in the manner best shown in Figure 16. The shaft support block 414 has an integral cylindrical projection 415 which is received in a bore 417 in side wall 245. A locking plate 419 which fits into an aligned counterbore 420 in side wall 245 is secured to the support block 414 by screws 422 to firmly fix the position of block 414.

Block 414 is formed with a longitudinal bore 424 in which a shaft 426 is received. Shaft 426 has a reduced portion 427 (Figure 13) extending out of block 414 upon which an intermediate gear cluster 428, made up of a worm 430 and worm wheel 432, is rotatably received. A thrust bearing 434 and a retainer ring 436 on the end of shaft portion 427 prevent axial movement of the intermediate gear cluster 428 therealong.

Longitudinal movement of the shaft 426 through bore 424 is prevented by the provision of a stud 438 threaded co-axially into the end of shaft 426 and a washer 440 held in abutting relation against the end of support block 414 by a nut 441 and a lock nut 442. A set screw 444 (Figure 16) threaded into support block 414 projects into a recess 446 in the shaft 426 and secures the shaft against rotation. A lock screw 448 is provided to prevent loosening of set screw 444.

The skirt 343 of the bearing housing 339, which is partially cut away, as shown in Figure 13, to allow the worm wheel 432 of intermediate gear cluster 428 to mesh with and be driven by worm 408 on cutter head shaft portion 332, serves as a lubricant shield or baffle to contain the oil spray thrown by centrifugal force from the rapidly rotating worm 408. Without such a skirt 343, some of the oil thrown from worm 408 would be thrown from the gear box between the castings 25 and 27.

Worm 430 meshes with a worm wheel 450 mounted for rotation upon a fixed stub shaft 452, the mounting of which is best shown in Figure 12. Stub shaft 452 has an enlarged portion 453 and a flange 454. The enlarged portion 453 is received in bore 455 in inner side wall 245 of casting 25 and is secured against rotative motion relative thereto by a lock plate 457 and a screw 458. The lock plate 457 fits into a coaxial counterbore 459 and screw 458 is threaded coaxially into the end of enlarged portion 453 of stub shaft 452. The shaft 452 is, therefore, locked against rotation relative to the side wall 245 between flange 454 and lock plate 457.

Worm wheel 450 is formed integral with an axially extending hollow shaft portion 461 rotatably received on stub shaft 452. Received on shaft portion 461 for rotation therewith is an axially recessed hub 463 which has a circular oil slinger disc 465 fixed around its outer periphery. A sprocket 467, having a hub 468 projecting partially into the recess of hub 463 formed on one face and a plurality of clutch teeth 469 formed on its opposite face, is rotatably mounted on shaft portion 461 by a bearing sleeve 470. A clutch collar 472, which has an annular peripheral groove 473 and complimentary clutch teeth 474, is fixed for rotation with and mounted for axial movement relative to shaft portion 461 by a key 476.

As the worm wheel 450 is rotated by worm 430, the hub 463 and clutch collar 472 rotate with it, while the sprocket 467 remains at rest. When the clutch collar 472 is moved axially to the right along the shaft portion 461, the clutch teeth 469 and 474 will be engaged to establish a driving connection to sprocket 467 from worm wheel 450.

A thrust bearing 478 takes up any end thrust exerted by the worm wheel 450 and is held in place on the end of shaft 452 by a retainer ring 479.

Referring now to Figures 6 and 12, a pair of sprockets 481 and 483 are fixed in axially spaced relation on the end of the outfeed roller shaft portion 239 for rotation therewith, a collar 484 of truncated conical form being disposed therebetween on shaft portion 239 for a purpose which will appear presently. Sprocket 483 is in alignment with the clutchable sprocket 467 on shaft 452. Similarly sprocket 485 is fixed to the end of infeed roller shaft portion 233 for rotation therewith in alignment with sprocket 481. An endless roller chain 487 (Figure 11) drivingly interconnects sprocket 467 and 483 while the sprockets 481 and 485 are drivingly interconnected by a chain 489. Thus, when the clutch teeth 469 and 474 are engaged, a driving connection is established to the feed rolls 229 and 231.

The position of clutch collar 472 is controlled by manipulation of handle 44 through a linkage now to be described. As shown in Figure 11, a circular boss 491 is integrally formed on the front wall of casting 27 of column 22. The boss 491 has an internal inclined bore 492 through which the shaft 46 extends. A shifter fork 494, which has fingers 495 and 496 straddling the clutch collar 472, is fixed to the inner end of shaft 46. Pins 497 and 498, projecting respectively from fingers 495 and 496, extend into the annular groove 473 in clutch collar 472.

The clutch collar 472 may be moved axially while it is rotating to engage or disengage the drive to sprocket 467 by rotating shaft 46. Rotation of shaft 46 causes the pins 497 and 498, which project into groove 473 in clutch collar 472, to move the collar 472 axially to either engage or disengage the clutch teeth 469 and 474.

The shaft 46 is rotatably mounted within the bore of a sleeve 500, which is fixed within bore 492 by a set screw 501, and is held against axial movement relative thereto by a resilient retainer ring 502 and a collar 503 fixed thereto as by a set screw 504.

The shaft 46 is retained in its set angular position within the bore of sleeve 500 by a plurality of spring loaded detents 505 which are received in axially extending holes 506 formed on the sleeve 500 about its through bore and which engage spaced recesses 507 formed in the adjacent face of collar 503. Detents 505 are biased into engagement with these recesses by compressed springs 508.

The action in the gear box when the planer is in operation is as follows:

The cutter head 308 is driven from drive motor 78 by belts 104 (Figures 3 and 5) which engage pulley 335 fixed to the right hand end of cutter head 308. As viewed from the left side of the planer (Figure 11), the cutter head is driven in a counter-clockwise direction. The worm 408 fixed thereto, therefore, rotates counter-clockwise. Counter-clockwise rotation of the worm 408 will cause the worm wheel 432 and its associated worm wheel 430 to rotate in a clockwise direction as viewed from the line 16—16 of Figure 13. Clockwise rotation of the worm 430 will cause the worm wheel 450 to rotate in a clockwise direction as viewed in Figure 13. When the clutch teeth 469 and 474 (Figure 12) are engaged, the sprocket 467 will be driven in a clockwise direction (Figure 11). The clutch sprocket 467 will then drive the outfeed roller shaft portion 239 through chain 487 in a clockwise direction and the infeed roller shaft portion 233 in a clockwise direction through chain 489 and sprocket 485. Thus the infeed roller 220 and outfeed roller 231 rotate in a clockwise direction while the cutter head 308 is driven in a counter-clockwise direction. When the clutch teeth 469 and 474 are disengaged, the cutter head 308 will rotate while the infeed and outfeed rollers 229 and 321 will be at rest.

When casting 27 is fixed to casting 25, a sealed enclosure therebetween is formed within which is contained the entire gear train assembly just described. This enclosure is filled with oil up to the level of the axis of the shaft 452 (Figures 11 and 13). As the worm wheel 450 is rotated, the slinger 465 also rotates continuously in an oil bath, the level of which covers preferably one-half or more of the slinger 465. The slinger 465 is so positioned that it clears the worm wheel 432 by a few thousandths of an inch, in the order of .001 to .005 being preferable. As the slinger 465 rotates, therefore, it will carry oil up to the worm wheel 432 which will be wiped off onto worm wheel 432 as it rotates so that worm wheel 432 will then carry oil to worm 408.

The chain 487 will always be partly submerged in the oil bath and will, therefore, carry oil up to sprockets 481 and collar 484. Collar 484, being of truncated conical form and having its larger end adjacent sprocket 483, serves as a centrifugal pump, oil being positively fed along its surface from its smaller end adjacent sprocket 481 to its larger end and on to sprocket 483. The chain 489 will then carry the oil from sprocket 483 to sprocket 485.

Operation

The operation of the planer can best be explained by reference to Figure 7. As explained above, the cutter head 308 rotates counter-clockwise while the infeed roller 229 and outfeed roller 231 rotate in a clockwise direction. The workpiece W is fed to the cutter head 308 along the top surface 34 of table 32 by the serrated infeed roller 229. After the work passes the cutter head 308, it is fed out to the rear of table 32 by the smooth outfeed roller 321. The ratio of speed reduction between the cutter head and the feed rollers is preferably in the order of 133 to 1. Thus, for example, when the cutter head is being driven at a speed of 4200 R. P. M. the rollers are revolving at a speed of 31.5 R. P. M. The feed rollers having a diameter of 1.75 inches will feed the work to the cutter head at about 14.5 feet per minute.

The maximum cut that may be taken on this planer is limited by the position of tie rod 213, the vertical distance between the bottom of the cutting circle 364 and the bottom of the tie rod 213 being the maximum depth of cut that may be taken and being preferably on the order of one-eighth inch.

When a workpiece is fed to the cutter head 308, it rides on the table rollers 179 and 180 which as explained above are preferably set to provide approximately .005" above surface 34.

In order that the work may be held firmly between the table rollers 179 and 180 and the feed rollers 229 and 231, the axes of the feed rollers 229 and 231 are each slightly offset inwardly toward the axis of the cutter head 308 from the axes of the table rollers as for example one-sixty fourth of an inch. A workpiece is, therefore, braced between the table rollers 179 and 180 and the feed rollers 229 and 231 so as to minimize any vibrations or chattering caused by the cutting action.

The depending portions 361 and 374 of the chip breaker 355 and pressure bar 372 respectively are formed so that their respective edges 362 and 376 are as close as possible to the cutting point which is the bottom-most point of the cutting circle 364. The edge 362 rests on the workpiece as the workpiece is fed toward the cutter head 308 and the weight of the chip breaker pressing down on the work at this point has the effect of further steadying or bracing the work against any chattering caused by the cutting action. The closer the edge 362 is to the cutting point, the more effective it is in steadying the work. As previously noted, the greater the depth of cut taken, the closer edge 362 will be to the cutting circle 364 and shorter chips will result. Thus as the chips increase in thickness, they are reduced in length so that the mass of the chips remain approximately constant. The advantage of this will appear presently.

The primary function of the chip breaker, however, is to break the chips away from the work. As the knives 314 cut the chips from the workpiece they are broken away from the work by the chip breaking edge 362 as the knives 314 pass that point. If the chips were not so broken off short, they might take the form of fairly long splinters and would thus be difficult to clear from the cutting area and the cutter head and a rough surface on the workpiece would result. The top 370 of chip breaker 355 extends rearwardly over the cutter head 308 and partially over the top of pressure bar 372. This overhang reduces to a minimum the possibility of the operator's fingers coming in contact with the revolving cutter head 308. The chip breaker, therefore, acts as a cutter head guard.

As the chips are cut from the work they are carried upwardly through the space between the cutter head 308 and the depending portion 361 and conveyed out over the top of the pressure bar 372.

The face 510 of the pressure bar depending portion 374 is arcuate and concentric with the axis of rotation of the cutter head 308 while the face 512 of the chip breaker depending portion 361 is smoothly curved so that the spacing between the cutting circle 364 and face 512 gradually increases from a minimum at the edge 362 toward a rearwardly facing opening between the chip breaker 355 and the pressure bar 372. By this formation, the cutter head 308 forms a blower directing a stream of air toward the point of engagement of the cutter head 308 with a workpiece and a stream of air upwardly and rearwardly therefrom for conveying wood particles away from the vicinity of the cutter head. Since the mass of the chips produced remains approximately constant, as previously pointed out, the effectiveness of this blower in removing wood chips will not vary to any appreciable extent with variations in the depth of cut.

As explained previously, the pressure bar 372 is pivoted around the axis of the cutter head 308 by means of mounting rings 380 and 382 (Figures 7 and 12). The function of the pressure bar 372 is to bring pressure to bear on a workpiece as close to the cutting point as possible to prevent chattering of the work caused by the cutting action and to brace and steady the work. The pressure bar 372 is adjusted pivotally about the axis of the cutter head 308 so that the edge 376 is a few thousandths of an inch below the cutting circle by means of adjusting nuts 392. As the adjusting nuts 392 are threaded in or out of the bosses 390 on pressure bar 372, the pressure bar will be rotated about the cutter head axis. In this manner the position of edge 376 may be adjusted to its proper point. Inasmuch as the pressure bar rotates about the axis of the cutter head the depending portion 374 cannot interfere with the cutting circle no matter what position it is moved to.

An initial pressure is put on the pressure bar 372 by means of nut 404 and pressure pads 400. After the pressure bar has been adjusted to its proper position so that the edge 376 is a few thousandths of an inch below the cutting circle 364, the nuts 404 are tightened down and the pressure pads will be compressed between washers 402 and adjusting nuts 396. An initial pressure will, therefore, be put upon the pressure bar 372 which must be overcome before the pressure bar can be moved at all. This initial pressure is brought to bear on the work by the edge 376 and is magnified by the difference between the lever arm distance to the line of action of the edge 376 and that of the adjusting nut 392. As the work passes through the planar, the edge 376 will, therefore, press down on the work with an initial pressure caused by the compressed pads 402 and magnified by the ratio of the distance between them and the cutter head axis to the distance between edge 376 and the cutter head axis.

As shown in Figure 7, the surface 510 of pressure bar 372 is located as close as possible to the cutting circle 364. This reduces to a minimum the possibility of the knives 314 carrying chips around with them from the preceding cut. Any chips that tend to cling to the knives will be cleared by the pressure bar.

Jointing attachment

The present invention provides means for mounting an improved jointing attachment upon the work support table 32 of the planing machine below the cutter head 308 without the necessity of removing any parts of the machine and which may be easily manipulated to sharpen the cutting knives 314. This jointing attachment is shown in detail in Figures 17 to 20 wherein the outline of the planing machine has been shown in phantom lines to indicate the position of this attachment when mounted in position on the planing machine work support table 32.

This attachment includes an elongated base 520 formed with an inclined surface 522, a support block 524 mounted for translatory movement along the inclined surface 522, and a jointing stone 526 mounted on the support block 524. The top of the block 524 is formed with a recess 528 within which the stone 526 is received and within which it is fixed by a thumb screw 530 which is threaded through a tapped hole in the support block 524 and abuts against stone 526 at its inner end to wedge stone 526 in position within recess 528.

As is best shown in Figure 20, the translatory movement of block 524 along surface 522 is guided by a pair of gib plates 532 and 534 fixed on the base 520 at each side of the surface 522 as by screws 536. The gib plates 532 and 534 are formed with inwardly projecting flanges 537 and 538 which are parallel to surface 522 and which project into slots 539 and 540 formed in the sides of the support block 524.

The vertical position of the stone 526 relative to the base 520 is varied by shifting its support block 524 along the inclined surface 522. For this purpose a shaft 542 (Figure 19) which is mounted for rotation in a bore 543 formed through an upwardly projecting portion 544 of base 520, is threadedly engaged with an aligned tapped hole 546 (Figures 17 and 20) formed in block 524. The axis of rotation of shaft 542 is parallel to the translatory path of movement of block 524 along surface 522.

A centrally slotted plate 548 is fixed to the projection portion 544 of base 520 by screws 549. Shaft 542 is formed with an annular groove 550 (Figure 18) which is straddled by the slot of plate 548 so that, while shaft 542 is free to rotate, it is held against axial movement by the engagement of plate 548 with the groove 550. A knurled knob 552 (Figures 17 and 19) is fixed to the outer end of shaft 542 to facilitate its rotary manipulation.

As shown in Figure 20, stop screws 554 are threadedly engaged in aligned tapped holes 555 formed in each side of the block 524 and each is fixed in its position by a locknut 556. The heads of these screws 554 form adjustable stops which abut against the inner walls of the columns at the limits of the translatory path of movement of the jointing attachment during ajointing operation.

As is best shown in Figure 1, a pair of transversely aligned holes 558 and 560 are formed in the table 32 through the top surface 34 thereof intermediate the rollers 179 and 180. When the knife blades are to be jointed, a guide bar 562 (Figures 17 and 19), which has a pair of guide pins 564 fixed thereto, is mounted on the top of the table 32 its pins 564 being fitted snugly into the holes 558 and 560 to hold the guide bar firmly in position on the table 32 in such position that it extends parallel to the axis of rotation of cutter head 308.

As will be noted in Figure 19, the base 520 of the jointing attachment is formed on its bottom with three longitudinally spaced pads 566, 567, and 568, the bottom faces of which are finished coplanar surfaces. It is upon the bottom faces of these three pads that the jointing attachment is adapted to firmly rest upon the work support surface 34 of table 32 while straddling the table rollers 179 and 180 as shown. A transverse slot 570, of rectangular cross-section, is formed across the central pad 567, to receive guide bar 562.

After guide bar 562 is mounted upon table 32 as previously described, the jointing attachment is placed on the table 32 in the position shown in Figure 19 with the guide bar 562 received within the slot 570 so that the jointing attachment can be manually reciprocated transversely of the machine along guide bar 562. Handles 572 and 574 are provided at each end of the base 520 so that the jointing attachment can be firmly held at each end by the operator and moved back and forth below the cutter head 308 which, during the jointing operation, is driven at its normal operating speed.

It should be noted that the handles 572 and 574 are located beyond the columns 22 and 24 and that the shaft 542 projects beyond these columns toward the front of the machine. By this construction, the height of the stone 526 may be adjusted during the jointing operation to take successive light cuts on the knives 314 and the attachment can be easily moved the full length of the cutter head, both without danger to the operator.

Combined grinding and jointing attachment

A combined grinding and jointing attachment, which is adapted to be used for resharpening the knife blades of the cutter head while the cutter head is mounted in its normal position in the planer, is shown in Figures 21 to 24 wherein the outline of the related parts of the planer are shown in phantom lines to illustrate the mounted position of the attachment. In order to mount this attachment on the planer, it is necessary to remove the chip breaker 355 to permit access to the cutter head 308 from the top of the machine. This is easily done by removing screws 356 at each end of the chip breaker front edge.

This attachment consists of a mounting structure adapted to be secured between the tops of the two columns 22 and 24, a motor driven grinder, and a jointing stone holder.

The mounting structure includes a pair of brackets 630 and 632, a fixed guide bar 634, a movable guide bar 636, and a support arm 638. Brackets 630 and 632 are each formed with spaced apertures 639 and 640 (Figure 22) which are so located that, after removal of the nuts 295, the screws 294 will extend therethrough. These brackets may thus be clamped firmly to the top of the column castings 25 and 28 by tightening the nuts 295 on the screws 294 after placing the brackets in position.

The ends of the front or fixed guide bar 634 are received within bores 642 and 643 (Figure 21) of the brackets 630 and 632 respectively and fixed therein by set screws 644.

The rear or movable guide bar 636 is received through coaxially aligned bores 646 and 647 in the rear end of the brackets 630 and 632 for free axial and pivotal movement relative thereto. Movement limit collars 648 and 650 are fixed to the guide bar 636 near its ends exteriorally of the brackets 630 and 632 by set screws 652.

The support arm 638 is formed at its rear end with a bore (not shown), through which the guide bar 636 extends, and is split as indicated at 654 (Figure 22) so that it may be clamped firmly to bar 636 by a clamping scerw 656. At its forward end arm 638 is formed with a threaded hole 658, the axis of which is substantially normal to and intersects that of the front guide bar 634. An adjusting screw 660 is threadedly received in hole 658 and its end abuts against the bar 634 so that the position of the arm 638 about the axis of bar 636 can be adjusted by manipulation of screw 660. As is best shown in Figure 21, the front end of arm 638 is split at 661 and a clamping screw 662 is provided for clamping adjusting screw 660 in its adjusted position.

Bracket 638 adjacent its end secured to guide bar 636 is formed with a boss 664 having a bore 666. Within this bore 666 the grinder and jointing stone holder is mounted. As shown in Figures 21 and 22, a grinder 668 comprising a motor housing portion 670 and a relatively smaller shaft housing portion 672 projecting through bore 666 is mounted on arm 638. A split cylindrical steel sleeve 674 is inserted within the bore 664 around this smaller portion 672 and the sleeve is wedged against the portion 672 by a thumb screw 676 to firmly hold the grinder 668 in adjusted position relative to the arm 638. Sleeve 674 prevents collapsing of the hollow housing portion 672 by the screw 676.

The motor shaft (not shown) extends downwardly through the housing portion 672 and a chuck 678 is secured to its projecting end for rotation therewith. A grinding stone 680 is mounted in chuck 678.

In order that the knife blades 314 be properly ground, it is necessary that the knife blades be held rigidly in position while the grinding wheel is fed along the length thereof. For this purpose I have provided an indexing device which includes index disc 682 adapted to be mounted on the pulley 335 on the end of shaft 334 of the cutter head 308 and an indexing pin and mount assembly 684 adapted to be mounted on the casting 29 of column 24 to coact with the disc 682 to hold the cutter head in a plurality of equiangularly spaced positions equal in number to the cutting knives on the cutter head.

The indexing pin and mount assembly 684 includes a bracket 686 (Figure 22) having a hollow boss 688 adapted to be fixed exteriorly to the outer side wall of column 24 as by screws 690. As is best shown in Figure 23, a pin 692 having a cylindrical portion 693, a tapered portion 694 and a stem 695 is mounted within the recess 697 of boss 688, the stem portion 695 projecting through a coaxial aperture 699 in the end thereof and having a knurled knob 701 fixed to its end. A compression spring 703 surrounds the stem portion 695 within the recess 697 and resiliently engages the cylindrical portion 693 to bias the indexing pin toward disc 682.

As in shown in Figure 22, index disc 682 is fixed to pulley 335 by a plurality of screws 705 and is formed with three apertures 707 which are located radially equidistant from the cutter head axis of rotation and are equiangularly disposed about that axis in predetermined relation to assure proper presentation of the knife blades to grind stone 680. The tapered end 694 will be biased by spring 703 into the aligned one of the apertures 707 as is shown in Figure 23 to hold the cutter head 308 in one of three fixed positions.

The screws 690 pass through holes in bracket 686 which are larger than the shanks of screws 690 so that the bracket 684 can be shifted within limits relative to the cutter head 308 while the screws 690 are loose. Since the relief angle ground on the knife blades 314 depends on the angular position of the knife blade relative to the grinding stone 680 during the grinding operation, this relative position can be varied by shifting the bracket 686 within its limits of movement to rotate the cutter head 308 through the engagement of pin 692 with the aligned aperture 707 of index disc 682. An adjustment by which the relief angle ground on the knife blades 314 may be varied is thus provided.

For the purpose of grinding the knife blades 314, therefore, it is merely necessary to remove the chip breaker 355, attach the disc 682 to the pulley 335, mount the indexing pin and mount assembly 684 on the exterior of column 24, and mount the sharpening tool mounting structure across the top of columns 22 and 24. The cutter head is rotated manually until the indexing pin 692 engages an aperture 707 to lock the cutter head in position for the grinding of one of its knives. The position of the grinding stone 680 relative to the cutting knife 314 is adjusted by screw 660 and the adjustment locked by screw 662. The operator then lifts the grinding stone 680 from contact with the cutting knife by pivoting bar 636 and arm 638 about their common pivot axis, shifts the arm 638 to one end of the cutting knife by pulling bar 636 to its limit position toward him, starts the grinder motor, lowers the grinding stone into contact with the cutting knife until the end of screw 660 rests on the bar 634, and, while holding the arm firmly in this position with one hand, feeds the grinder along the length of the knife by pushing bar 636 from him to its opposite limit position. After a grinding cut has been taken on one blade, the pin 692 is pulled out and the cutter head rotated until the next cutting knife is in position and the grinding operation is repeated.

After the grinding of all knives has been completed, the same sharpening tool support structure is utilized for jointing the knives. For this purpose the indexing pin and mount assembly 684 and the grinder are removed and a jointing stone 710 (Figure 24) is mounted within a recess 712 of the head 714 of an adapter 716 substituted for the grinder 668. The stone 710 is fixed within the recess 712 by screws 717 and the adapter 716, which has a cylindrical stem 718, is fixed within the bore 666 of arm 638 by the coaction of split sleeve 674 and screw 676 in the same manner as was grinder 668. After the planer is started so that the cutter head 308 is rotating at normal operating speed, the jointing stone 710 is fed back and forth along the rotating cutter head in the same manner as was the grinder 668.

It is in conjunction with this attachment that the knife blade adjusting means described in reference to Figure 15 is of extreme importance because the knife blades 314 must be accurately adjusted before the grinding operation is initiated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a wood planing machine, a pair of rigidly spaced erect columns; a work support table having a work support surface formed with longitudinally spaced transversely extending slots; means mounting said table on said columns for vertical translatory movement therebetween; a cutter head; means on said columns mounting said cutter head for rotation about an axis above said table and parallel to said surface; a freely rotatable idler roller mounted for rotation below each of said table slots about transverse axes and each having a small segmental portion projecting through its associated slot above said surface, a pair of feed rollers mounted for rotation between said columns above said table about axes parallel to that of said cutter head, one of said feed rollers being spaced between said cutter head and each of said idler rollers longitudinally of said table; a chip breaker mounted for limited pivotal movement about an axis parallel to and spaced forwardly of said table from said cutter head axis, said chip breaker having a portion disposed closely adjacent the forward portion of the cutting circle of said cutter head and terminating in a transverse chip breaking edge; and a pressure bar pivotally mounted concentrically with said cutter head axis of rotation and having a portion closely adjacent the rearward portion of the cutter head cutting circle which terminates in a workpiece engaging transverse edge.

2. The combination defined in claim 1, wherein the faces of said pressure bar and said chip breaker adjacent said cutter head are of such configuration as to coact therewith to form a blower for producing an air stream to convey wood particles and dust from the vicinity of said cutter head.

3. The combination defined in claim 1 including means on the forward one of said feed rollers for automatically vertically adjusting the chip breaking edge of said chip breaker to accommodate workpieces of different thicknesses.

4. In a planing machine, a table having a work support surface; a power driven cutter head mounted for rotation above said surface about a transverse axis parallel thereto; means defining a curving wall closely surrounding the major portion of the cutting circle of said cutter head and having a first transverse opening in the bottom thereof through which the lower portion of said cutter head projects for engagement with a workpiece fed along said work support surface, a second transverse opening near the top of said cutter head facing rearwardly and a passage between the cutting circle of said cutter head and said wall gradually increasing in area between said first and second openings in the direction of rotation of said cutting head and cooperating with the cutter head to provide a high velocity air stream between said cutter head and said wall in said passage upon rapid rotation of said cutter head for conveying wood particles and dust from the point of workpiece engagement by said cutter head to said second opening for discharge to the rear of the machine.

5. The combination defined in claim 4, wherein said wall defining means includes a pressure bar having a wall portion closely surrounding the rearward face of said cutter head and a chip breaker having a wall portion eccentric to the cutting circle of said cutter head and closely surrounding the forward face of said cutter head adjacent said first opening.

6. In a wood planing machine having a table providing a work support surface, and a cutter head mounted for rotation about a transverse axis parallel to and above said planar work support surface; a chip breaker having a lower chip breaking edge extending transversely of said work support surface closely adjacent the cutting circle of said cutter head and a curved wall, extending upwardly and rearwardly around and diverging from the cutting circle of said cutter head so that said cutter head and said chip breaker coact to form a blower producing a rapidly moving air stream for conveying wood dust and chips from the vicinity of said cutter head toward the rear of the machine.

7. In a planing machine, a work support table; a cutting head mounted for rotation above said work support table; an infeed roller mounted for rotation above said table about an axis spaced from and parallel to the axis of rotation of said cutter head; a chip breaker having a breaker skirt disposed between said cutting head and said infeed roller and having a chip breaking edge extending parallel to the cutting head axis of rotation closely adjacent the cutting circle of said cutting head; means biasing said chip breaker toward said table to exert a predetermined pressure upon a workpiece fed to said cutter head; and means mounting said chip breaker for preventing an increase in the engagement pressure between said chip breaker and a workpiece due to the frictional contact therebetween.

8. In a planing machine, a table having a work support surface, a power driven cutter head mounted for rotation above said table on a transverse axis parallel to said planar surface, a power driven infeed roller mounted for rotation above said planar surface about an axis spaced from and parallel to that of said cutter head, a chip breaker disposed intermediate said infeed roller and said cutter head and having a transversely extending chip breaking edge located closely adjacent the cutting circle of said cutter head, means for so mounting said chip breaker that its chip breaking edge is biased toward said work support surface, and means for automatically adjusting the position of the breaking edge of said chip breaker relative to said work support surface in accordance with the depth of cut to be taken upon a given workpiece.

9. In a planing machine, a table having a work support surface, a power driven cutter head mounted for rotation above said work support surface about a transverse axis parallel thereto, a chip breaker mounted for limited pivotal movement about an axis above said table, parallel to, and in front of that of said cutter head, said chip breaker having a depending portion terminating in a transversely extending chip breaking edge disposed closely adjacent the cutting circle of said cutter head, means for feeding a workpiece along said work support surface toward said cutter head, means for sensing the depth of cut to be taken on each workpiece, and means responsive to said sensing means for automatically adjusting the vertical position of the chip breaking edge of said chip breaker with respect to said work support surface in accordance with the depth of cut to be taken.

10. In a planing machine, a table having a work support surface, a power driven cutter head mounted for rotation above said work support surface about a transverse axis parallel thereto, a chip breaker mounted for limited pivotal movement about an axis above said work support surface parallel to and in front of said cutter head, said chip breaker having a depending portion terminating in a transversely extending chip breaking edge disposed closely adjacent the cutting circle of said cutting head, a power driven infeed roller, means mounting said infeed roller for rotation above said work support surface intermediate the pivot axis of said chip breaker and said chip breaker depending portion about a vertically movable axis, parallel to that of said cutter head, means resiliently biasing said infeed roller toward said work support surface to engage a workpiece fed thereto and coacting means on said chip breaker and said infeed roller for lifting the chip breaking edge of said chip breaker relative to said work support surface to a position corresponding to the depth of cut to be taken upon engagement of said infeed roller with said workpiece.

11. In a wood planing machine, a table having a work support surface, a power driven cutter head mounted for rotation above said surface about a transverse axis parallel thereto, a power driven workpiece feed roller mounted for rotation above said surface about an axis parallel to that of said cutter head and spaced rearwardly therefrom longitudinally of said table, a pressure bar having a portion depending intermediate said cutter head and said roller and terminating in a workpiece-engaging lower edge closely adjacent the cutting circle of said cutter head and extending parallel to the axis of rotation thereof, means mounting said pressure bar for pivotal movement coaxial with said cutter head, means for limiting pivotal movement of said pressure bar in the direction of cutter head rotation in a position in which the workpiece-engaging edge thereof lies in a plane parallel to that of said work support surface and substantially tangent to the cutting circle of said cutting head, and means resiliently biasing said pressure bar toward such limit position so that said pressure bar is preloaded to firmly hold a workpiece against said work support surface without producing deformation thereof.

12. The combination defined in claim 11 wherein said pressure bar biasing means includes a compressed elastic pad.

13. The combination defined in claim 11 wherein the line of action of said biasing means upon said pressure bar is at a greater radial distance from the pressure bar pivot axis than said pressure bar workpiece engaging edge.

14. In a woodworking machine, a work support, a power driven cutter head mounted for rotation about an axis spaced from said work support; a member having an edge extending closely adjacent the cutting circle of said cutter head adjacent said work support and a curved wall extending from said edge around and continuously diverging from the cutting circle of said cutter head in the direction of cutter head rotation so that said cutter head and said member coact to form a blower producing a rapidly moving air stream for conveying waste from the vicinity of said cutter head, the extent and curvature of said wall being such that the conveyed waste is directed away from the normal position of an operator feeding work to said cutter head over said support.

15. In a woodworking machine, a rotatable power driven cutter head and means defining an air duct about a portion of the cutting circle of said cutter head of increasing cross sectional area in the direction of rotation of said cutter head and terminating in a discharge opening directed away from the normal position of an operator feeding work to said cutter head so that said cutter head and said means coact to form a blower producing a rapidly moving air stream for conveying waste from the vicinity of said cutter head.

16. In a planer, a rotatable power driven cutter head, a chip breaker, means so mounting said chip breaker as to maintain a substantially uniform size chip from varying depths of cut by said cutter head, and means defining an air duct about a portion of the cutting circle of said cutter head of increasing cross sectional area in the direction of rotation of said cutter head and terminating in a discharge opening directed away from the normal position of an operator feeding work to said cutter head so that said cutter head and said means coact to form a blower producing a rapidly moving air stream for conveying such chips and dust from the vicinity of the cutter head.

17. In a planing machine, a rotatable power driven cutter head, a chip breaker having a chip breaking edge extending parallel to the cutting head axis of rotation closely adjacent the cutting circle of said cutter head, and means operative as a work piece is advanced toward said chip breaker for automatically adjusting the position of the chip breaking edge of said chip breaker in accordance with the depth of cut to be taken upon a given work piece fed to said cutter head.

18. The planing machine defined in claim 17 wherein said chip breaker is mounted for movement in a predetermined path under control of said adjusting means to so position said chip breaking edge relative to the cutting circle of said cutter head as to maintain substantially uniform size chips with varying depths of cut.

19. In a planing machine, a rotatable power driven cutter head, a chip breaker having a chip breaking edge extending parallel to the cutting head axis in rotation closely adjacent the cutting circle of said cutter head, and means mounting said chip breaker to exert a predetermined substantially uniform pressure upon work pieces fed to said cutter head and to prevent an increase in the engagement pressure between said chip breaker and a work piece due to frictional contact therebetween.

20. The planing machine defined in claim 19 wherein said chip breaker is mounted for limited pivotal movement about an axis above the path of movement of work to said cutter head and parallel to and in front of the axis of said cutter head.

21. In a woodworking machine, a table having a work support surface, a power driven cutter head mounted for rotation in spaced relation to said surface about a transverse axis parallel thereto, a pressure bar having a portion terminating in a work piece engaging edge closely adjacent the cutting circle of said cutter head and extending parallel to the axis of rotation thereof, means mounting said pressure bar for limited movement relative to said cutter head, means for limiting movement of said pressure bar in one direction to a position in which the work piece engaging edge thereof lies in a plane parallel to said work support surface and substantially tangent to the cutting circle of said cutting head, and means biasing said pressure bar towards such limit position so that said pressure bar is preloaded to firmly hold the work piece against said work support surface without producing deformation thereof.

22. In a woodworking machine, a rotatably mounted power driven cutter head, a pressure bar having a portion disposed rearwardly of the cutting circle of said cutter head and terminating in a work engaging surface substantially tangent to said cutter head cutting circle, and means mounting said pressure bar for limited pivotal movement about an axis located forwardly of the forward edge of said surface.

23. The machine defined in claim 22 wherein said pressure bar pivot axis is coincident with the cutter head axis of rotation.

References Cited in the file of this patent

UNITED STATES PATENTS

| | | |
|---|---|---|
| 309,341 | Fritz | Dec. 16, 1884 |
| 519,401 | Campbell | May 8, 1894 |
| 543,219 | Premo | July 23, 1895 |
| 632,618 | Anderson | Sept. 5, 1899 |
| 693,559 | Mershon | Feb. 18, 1902 |
| 983,850 | Whipple | Feb. 7, 1911 |
| 987,478 | Mitchell | Mar. 21, 1911 |
| 1,035,187 | Harrold | Aug. 13, 1912 |
| 1,038,500 | Foley et al. | Sept. 10, 1912 |
| 1,079,032 | Solem | Nov. 18, 1913 |
| 1,153,910 | Harrold | Sept. 21, 1915 |
| 1,225,552 | Wuesthoff | May 8, 1917 |
| 1,333,710 | Folsom | Mar. 16, 1920 |
| 1,583,879 | Hallock | May 11, 1926 |
| 1,651,013 | Buss et al. | Nov. 29, 1927 |
| 1,844,069 | Mattison | Feb. 9, 1932 |
| 1,946,931 | Chong | Feb. 13, 1934 |
| 2,005,551 | MacDonald | June 18, 1935 |
| 2,091,374 | Pease | Aug. 31, 1937 |
| 2,377,984 | Ward | June 12, 1945 |
| 2,432,190 | Dick | Dec. 9, 1947 |
| 2,449,201 | Buss | Sept. 14, 1948 |
| 2,577,975 | Moore | Dec. 11, 1951 |
| 2,589,865 | Rivard | Mar. 18, 1952 |
| 2,598,933 | Nevin | June 3, 1952 |

FOREIGN PATENTS

| | | |
|---|---|---|
| 25,351 | Great Britain | of 1901 |
| 566,089 | France | Nov. 17, 1923 |
| 434,574 | Germany | Sept. 29, 1926 |
| 451,315 | Great Britain | Aug. 4, 1936 |

UNITED STATES PATENT OFFICE
CERTIFICATE OF CORRECTION

Patent No. 2,792,036                                        May 14, 1957

Richard A. Buttke

It is hereby certified that error appears in the printed specification of the above numbered patent requiring correction and that the said Letters Patent should read as corrected below.

Column 3, lines 63 and 72, column 4, line 14, column 5, line 67, column 7, lines 32, 35 and 45, column 9, line 69, and column 13, lines 38 and 51, for "planer", in each occurrence, read -- planar --; column 5, line 74, for "casing" read -- casting --; column 7, line 74, for "intergal" read -- integral --; column 16, line 46, for "receivel" read -- received --; column 18, line 72, for "planar" read -- planer --; column 21, line 45, for "in", first occurrence, read -- is --.

Signed and sealed this 6th day of August 1957.

(SEAL)
Attest:
KARL H. AXLINE

Attesting Officer

ROBERT C. WATSON
Commissioner of Patents

UNITED STATES PATENT OFFICE
CERTIFICATE OF CORRECTION

Patent No. 2,792,036                                                        May 14, 1957

Richard A. Buttke

It is hereby certified that error appears in the printed specification of the above numbered patent requiring correction and that the said Letters Patent should read as corrected below.

Column 3, lines 63 and 72, column 4, line 14, column 5, line 67, column 7, lines 32, 35 and 45, column 9, line 69, and column 13, lines 38 and 51, for "planer", in each occurrence, read -- planar --; column 5, line 74, for "casing" read -- casting --; column 7, line 74, for "intergal" read -- integral --; column 16, line 46, for "receivel" read -- received --; column 18, line 72, for "planar" read -- planer --; column 21, line 45, for "in", first occurrence, read -- is --.

Signed and sealed this 6th day of August 1957.

(SEAL)
Attest:
KARL H. AXLINE

Attesting Officer

ROBERT C. WATSON
Commissioner of Patents